US012598281B2

(12) United States Patent
Arai

(10) Patent No.: US 12,598,281 B2
(45) Date of Patent: Apr. 7, 2026

(54) CONTROL APPARATUS, CONTROL METHOD, AND STORAGE MEDIUM FOR DETERMINING A CAMERA PATH INDICATING A MOVEMENT PATH OF A VIRTUAL VIEWPOINT IN A THREE-DIMENSIONAL SPACE

(71) Applicant: CANON KABUSHIKI KAISHA, Tokyo (JP)

(72) Inventor: Tomoaki Arai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 123 days.

(21) Appl. No.: 18/419,611

(22) Filed: Jan. 23, 2024

(65) Prior Publication Data

US 2024/0283905 A1     Aug. 22, 2024

(30) Foreign Application Priority Data

Feb. 22, 2023     (JP) ................................. 2023-026039
Nov. 9, 2023     (JP) ................................. 2023-191402

(51) Int. Cl.
 *H04N 13/279*     (2018.01)
 *G06T 7/50*     (2017.01)
 *G06T 15/00*     (2011.01)
(52) U.S. Cl.
 CPC ............. *H04N 13/279* (2018.05); *G06T 7/50* (2017.01); *G06T 15/00* (2013.01)
(58) Field of Classification Search
 CPC ............. H04N 13/279; H04N 21/2187; H04N 21/21805; H04N 23/90; H04N 7/181; G06T 7/50; G06T 15/00; G06T 19/003
 See application file for complete search history.

(56) References Cited

U.S. PATENT DOCUMENTS 11,006,089 B2     5/2021  Arai
11,831,853 B2    11/2023  Arai
(Continued)

FOREIGN PATENT DOCUMENTS

JP          2005-250800 A     9/2005
JP          2012-063958 A     3/2012
WO          2022/192885 A1    9/2022

OTHER PUBLICATIONS

Extended European Search Report issued by the European Patent Office on Jul. 17, 2024 in corresponding EP Patent Application No. 24154413.9.

(Continued)

*Primary Examiner* — Maurice L. Mcdowell, Jr.
(74) *Attorney, Agent, or Firm* — Carter, DeLuca & Farrell LLP

(57)     ABSTRACT

To provide a technique capable of obtaining a desired camera path by a simple operation even in a case where a large structure whose shape is complicated exists in a three-dimensional section. A camera path indicating a movement path of a virtual viewpoint in a specific area in a three-dimensional space is determined based on shape data of a structure. Then, in a case where a position of a virtual viewpoint indicated by an operation signal that is input is included in the specific area, virtual viewpoint information is generated by correcting the position of the virtual viewpoint indicated by the operation signal based on the camera path.

20 Claims, 18 Drawing Sheets

(56) References Cited

U.S. PATENT DOCUMENTS

| | | | |
|---|---|---|---|
| 2018/0246631 A1* | 8/2018 | Maruyama | G06T 19/20 |
| 2018/0359457 A1* | 12/2018 | Morisawa | H04N 13/128 |
| 2019/0213791 A1* | 7/2019 | Hanamoto | H04N 5/2224 |
| 2019/0265876 A1 | 8/2019 | Ishikawa | |
| 2020/0275083 A1* | 8/2020 | Yoneda | H04N 21/4728 |
| 2021/0021803 A1* | 1/2021 | Handa | G06T 7/73 |
| 2024/0078687 A1 | 3/2024 | Arai | |

OTHER PUBLICATIONS

Office Action issued by the European Patent Office on Dec. 9, 2025 in corresponding EP Patent Application No. 24154413.9, pp. 1-7.

* cited by examiner

| FIG.7A |
|--------|
| FIG.7B |

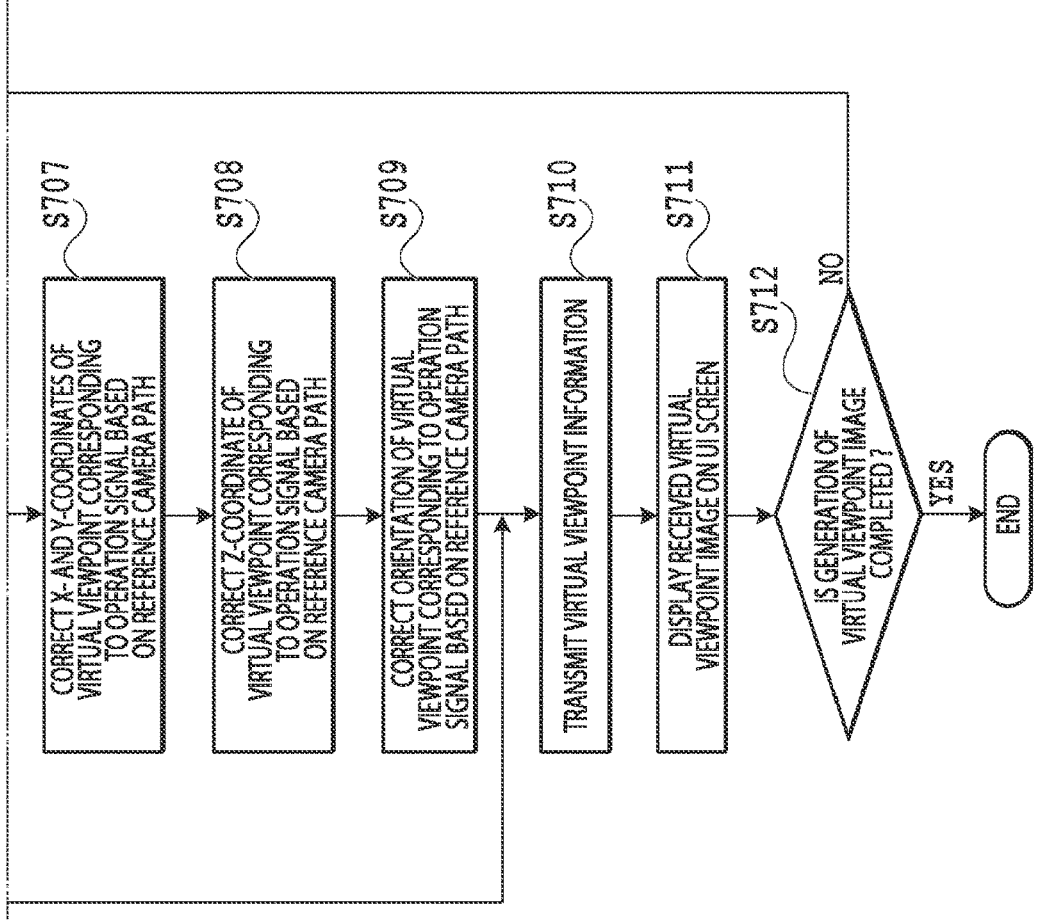

S707   CORRECT X- AND Y-COORDINATES OF VIRTUAL VIEWPOINT CORRESPONDING TO OPERATION SIGNAL BASED ON REFERENCE CAMERA PATH

S708   CORRECT Z-COORDINATE OF VIRTUAL VIEWPOINT CORRESPONDING TO OPERATION SIGNAL BASED ON REFERENCE CAMERA PATH

S709   CORRECT ORIENTATION OF VIRTUAL VIEWPOINT CORRESPONDING TO OPERATION SIGNAL BASED ON REFERENCE CAMERA PATH

S710   TRANSMIT VIRTUAL VIEWPOINT INFORMATION

S711   DISPLAY RECEIVED VIRTUAL VIEWPOINT IMAGE ON UI SCREEN

S712   IS GENERATION OF VIRTUAL VIEWPOINT IMAGE COMPLETED ?

NO

YES

END

FIG. 7B

CONTROL APPARATUS, CONTROL METHOD, AND STORAGE MEDIUM FOR DETERMINING A CAMERA PATH INDICATING A MOVEMENT PATH OF A VIRTUAL VIEWPOINT IN A THREE-DIMENSIONAL SPACE

FIELD

The present invention relates to a technique to control a virtual viewpoint for generating a virtual viewpoint image.

DESCRIPTION OF THE RELATED ART

There is a technique to generate an image (virtual viewpoint image) representing an appearance from a virtual viewpoint designated by the operation of a user by installing a plurality of imaging devices at different positions to perform synchronous image capturing and by using a plurality of captured images obtained by the image capturing. In a case of generating a virtual viewpoint image, a user sets the position and orientation of a new virtual viewpoint continuously in a time series by operating a joystick or the like by referring to, for example, an already generated virtual viewpoint image corresponding to the virtual viewpoint capturing a desired object. The movement path of the virtual viewpoint thus set is generally called "camera path". It is possible for a user to move the virtual viewpoint by taking the whole three-dimensional space of the image capturing target as the target, but for example, in a such a case where a person as an object is running on a large structure whose shape is complicated, it is necessary to pay attention so that the virtual viewpoint is not natural due to the relationship with the large structure. In this regard, Japanese Patent Laid-Open No. 2012-063958 has disclosed a technique to correct, in a case where part of the camera area indicating the movable range of the virtual camera (≈virtual viewpoint) overlaps an obstacle (no entry area), such as a wall of a building, the position of the virtual viewpoint by moving the camera area to the outside of the obstacle. Further, Japanese Patent Laid-Open No. 2005-250800 has disclosed a technique to correct, in a case where a user changes the movement path of the virtual camera (≈virtual viewpoint) from the default movement path, the movement path so that the distance from an obstacle (for example, a wall of a narrow path) does not become less than or equal to a predetermined distance.

In a case where the shape of the large structure is complicated, with the technique of Japanese Patent Laid-Open No. 2012-063958 and Japanese Patent Laid-Open No. 2005-250800 described above, it is difficult for a user to obtain a desired camera path by a simple operation because it is necessary to perform a complicated operation in order to obtain a natural camera path. The present invention has been made in view of the above-described program.

The control apparatus according to the present invention includes: one or more memories storing instructions; and one or more processors executing the instructions to perform: obtaining shape data representing a shape of a structure existing in a three-dimensional space; receiving an operation signal controlling a virtual viewpoint for generating a virtual viewpoint image; and generating virtual viewpoint information indicating a position and orientation of a virtual viewpoint identified based on the operation signal, wherein in the generating: a camera path indicating a movement path of a virtual viewpoint in a specific area in the three-dimensional space is determined based on the shape data of the structure; and in a case where a position of a virtual viewpoint identified based on the operation signal is included in the specific area, the virtual viewpoint information is generated by performing correction so that the position of the virtual viewpoint indicated by the operation signal is located on the camera path.

Further features of the present invention will become apparent from the following description of exemplary embodiments with reference to the attached drawings.

DESCRIPTION OF THE EMBODIMENTS

Figure 1A:
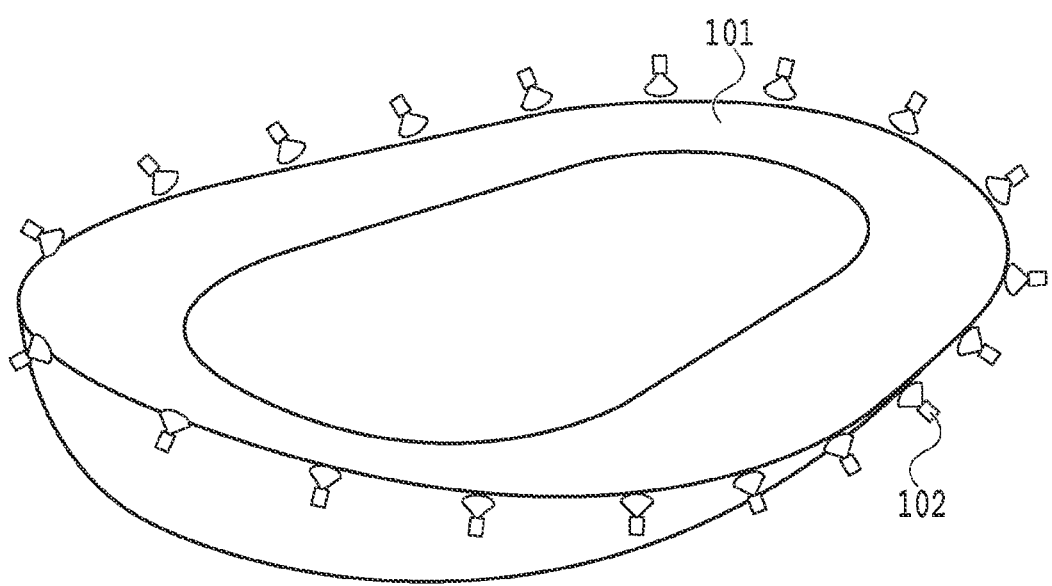
FIG. 1A is a diagram showing a state where a plurality of imaging devices is installed on a bank and FIG. 1B is a diagram explaining definition of a world coordinate system and a virtual viewpoint coordinate system (camera coordinate system)

Hereinafter, with reference to the attached drawings, the present invention is explained in detail in accordance with preferred embodiments. Configurations shown in the following embodiments are merely exemplary and the present invention is not limited to the configurations shown schematically.

<Review of Problem>

For example, a case is considered where a virtual viewpoint image is generated by taking soccer as a target, which is played on a wide, flat field. It is possible for a user to set a camera path in which, for example, tracking of a player is started from the position capturing the player from behind and at timing at which a ball is kicked toward the goal, the position is changed to a position capturing the player from ahead, within an image capturing space with a high degree of freedom. Here, the "image capturing space" means a virtual three-dimensional space represented by computer graphics or the like, which corresponds to a three-dimensional space in which a plurality of imaging devices performs image capturing actually. In contrast to this, for example, a case is considered where a virtual viewpoint image is generated by taking a track competition of bicycle as a target. In the track competition of bicycle, a player runs on a circular track in which a curve section whose inclination gradually changes up to a maximum inclination of 30 to 45 degrees, and a flat, straight section are connected continuously. In this case, even with the technique of Japanese Patent Laid-Open No. 2012-063958 and Japanese Patent Laid-Open No. 2005-250800, it is difficult to set a natural camera path. For example, it is assumed that a cameral path along which the cameral moves in parallel to a player running on the bank is set by applying the technique of Japanese Patent Laid-Open No. 2012-063958. In this case, in the stage in which a player is running into the curve section, the angle of inclination of the track surface gradually increases as the virtual viewpoint moves, which moves in parallel to the player, and each time the camera area and the no entry area overlap, the position of the virtual viewpoint is corrected. With the camera path obtained in this manner, the virtual camera describes a locus zigzag in the vertical direction accompanying the movement of the player, and therefore, it is not possible to obtain a virtual viewpoint image worth viewing. Further, in the stage in which the player is running out of the curve section, the angle of inclination of the track surface gradually becomes less steep accompanying the movement of the player and the camera area and the no entry area no longer overlap, and therefore, the position of the virtual viewpoint is not corrected at all. With the camera path thus obtained, the distance between the virtual viewpoint and the track surface increases gradually. In order to avoid this, it is necessary to perform a detailed operation for maintaining the virtual viewpoint at a predetermined height from the track surface whose height changes gradually, and therefore, the load of a user becomes heavy. Further, in a case where the technique of Japanese Patent Laid-Open No. 2005-250800 is applied, for example, in a case where the correction of the position of the virtual viewpoint is performed at the entrance of the curve section whose angle of inclination is gradual and the position is changed to a portion whose angle of inclination is large with the state being maintained, the position of the virtual viewpoint is buried inside the bank. In order to avoid this, it is necessary to perform correction again by once removing the position of the virtual viewpoint from the default camera path, but this will make the operation of the virtual viewpoint quite complicated.

As above, with the prior art, for example, in a case where an object moves on a large structure having a complicated three-dimensional shape, such as a bank, a complicated operation of virtual viewpoints is required in order to set a natural camera path without a sense of incongruity. The technique of the present invention has been made in view of the above points and an object thereof is to make it possible to set a natural camera path by a simpler operation.

<Explanation of Image Capturing Space>

FIG. 1A is a diagram showing the state where a plurality of imaging devices (real cameras) 102 is installed on a bank 101, which is a track competition stadium of bicycle (velodrome) according to the present embodiment. As described above, the bank 101 is a circular track consisting of straight sections and curve sections. The bank 101 is designed so that the track is inclined so as to enable a bicycle to run at high speed and the track has the maximum angle in the curve section and the angle gradually becomes small toward the straight section. In the example in FIG. 1A, the plurality of the imaging devices 102 is installed so as to surround the bank 101.

Figure 1B:
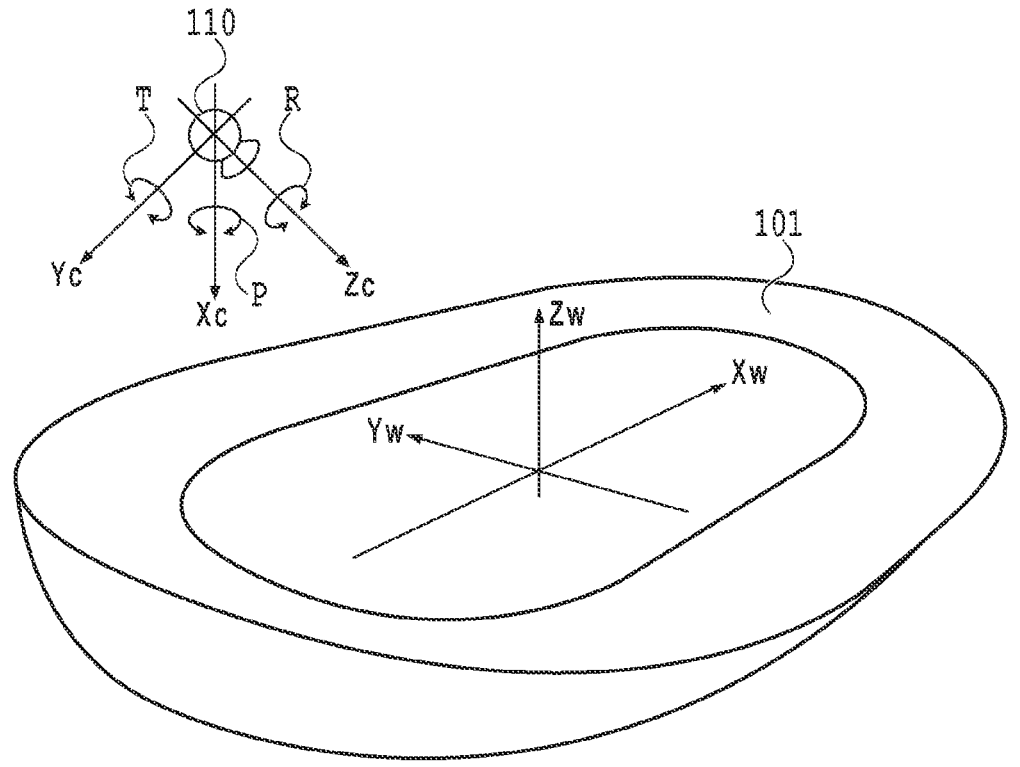

FIG. 1B is a diagram explaining definition of a world coordinate system and a virtual viewpoint coordinate system (camera coordinate system) in a case where a three-dimensional space containing the bank 101 is taken as the image capturing target. In the present embodiment, in the world coordinate system, the center of the bank 101 is taken to be the origin, the long-side direction of the bank 101 is taken to be the X-axis, the short-side direction of the bank 101 is taken to be the Y-axis, and the direction perpendicular to the X-axis and the Y-axis is taken to be the Z-axis, and the X-axis, the Y-axis, and the Z-axis are described as Xw, Yw, and Zw, respectively. In this case, the orientation of the arrow of the axis of each of Xw, Yw, and Zw represents the plus direction. Further, in the present embodiment, in the camera coordinate system, the optical center of a virtual viewpoint (virtual camera) 110 is taken to be the origin, the optical axis direction is taken to be the Z-axis, the transverse direction (right-left direction) of the virtual camera 110 is taken to be the X-axis, and the vertical direction (up-down direction) of the virtual camera 110 is taken to be the Y-axis. Then, the axes of XYZ are described as Xc, Yc, and Zc, respectively. In this case, it is assumed that the orientation of the arrow of each axis of Xc, Yc, and Zc represents the plus direction. The direction of the virtual camera 110 is represented by rotation (pan) with the up-down direction for the orientation of the virtual viewpoint being taken as the axis, rotation (tilt) with the right-left direction for the orientation of the virtual viewpoint being taken as the axis, and rotation (roll) with the forward-backward direction for the orientation of the virtual viewpoint being taken as the axis. That is, a pan P is a parameter representing rotating the optical axis of the virtual camera 110 in the right-left direction, and is the rotation of the virtual camera 110 around the pan axis. A tilt T is a parameter representing rotating the optical axis of the virtual camera 110 in the up-down direction, and is the rotation of the virtual camera 110 around the tilt axis. A roll R is a parameter representing the rotation about the optical axis of the virtual camera 110, and is the rotation of the virtual viewpoint around the roll axis.

The definition of the world coordinate system and the virtual viewpoint coordinate system described above is one example and they may be defined by another method.

<System Configuration>

Figure 2:
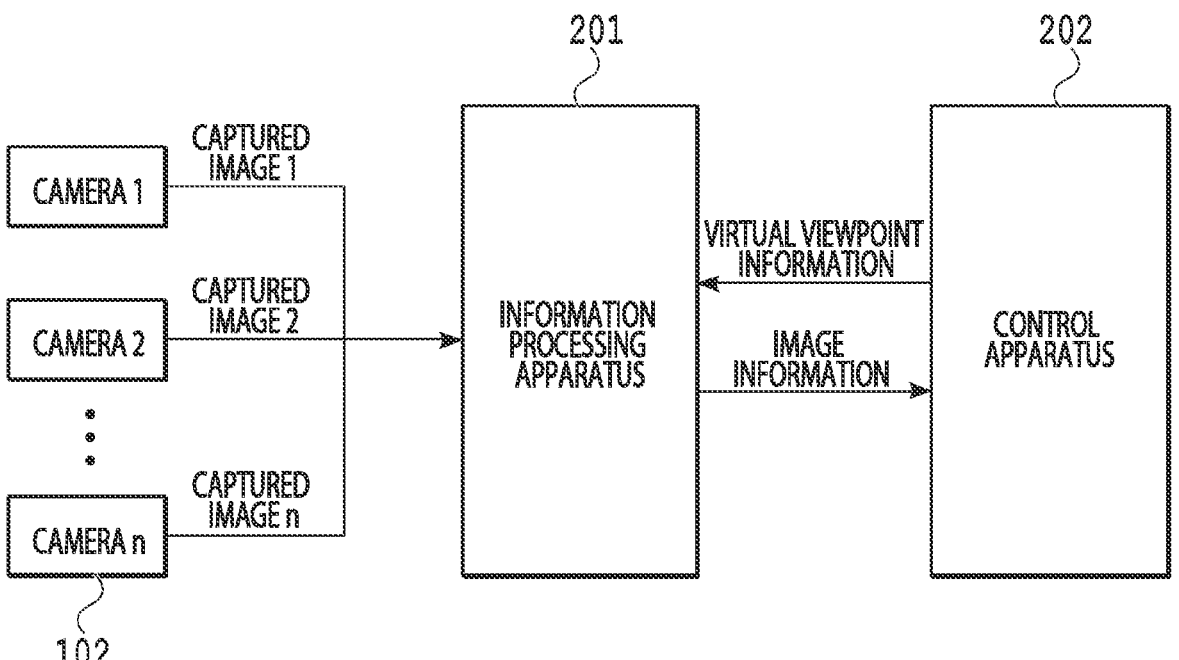
FIG. 2 is a diagram showing a configuration example of an image processing system.

FIG. 2 is a diagram showing a configuration example of an image processing system according to the present embodiment. The image processing system has an information processing apparatus 201 and a control apparatus 202 and the information processing apparatus 201 is connected with the plurality of the imaging devices 102.

The plurality of the imaging devices 102 is arranged so that each captures part or the whole of the bank 101 and the viewing angles of at least the two imaging devices overlap, and connected to one another via, for example, a transmission cable. Further, the plurality of the imaging devices 102 is installed so as to face a gaze point set in advance. In a case where a plurality of gaze points is set, each gaze point is captured from different directions by the two or more imaging devices 102. The images captured by the plurality of the imaging devices 102 are transmitted to the information processing apparatus 201. The images captured by the plurality of the imaging devices 102 may be still images or moving images, or both still images and moving images. In the present embodiment, unless described particularly, it is assumed that the term "image" includes both still image and moving image.

The information processing apparatus 201 is an image processing server generating a virtual viewpoint image based on a plurality of captured images obtained by the plurality of the imaging devices 102 capturing an object from a plurality of directions. The virtual viewpoint image is also called free-viewpoint image and an image corresponding to the virtual viewpoint designated freely (arbitrarily) by a user in the image capturing-target three-dimensional space. Further, in the present embodiment, a case where the virtual viewpoint image is a moving image is explained mainly, but the virtual viewpoint image may be a still image. The information processing apparatus 201 obtains captured images obtained by the plurality of the imaging devices 102 installed along the bank 101 performing image capturing at a predetermined frame rate. The predetermined frame rate is taken to be, for example, 60 fps, but this is not limited. The information processing apparatus 201 obtains a plurality of captured images from the plurality of the imaging devices 102 by a wired or wireless communication module, or an image transmission module, such as SDI.

The information processing apparatus 201 generates an image representing an appearance from the virtual viewpoint identified by virtual viewpoint information as a virtual viewpoint image by using the virtual viewpoint information received from the control apparatus 202 and the plurality of captured images received from the plurality of the imaging devices 102. The virtual viewpoint image is generated by using, for example, image base rendering (IBR). The IBR is a rendering method of generating a virtual viewpoint image by deformation and composition of a plurality of captured images without performing modeling (process to create the shape of an object by using the geometrical figures). However, it may also be possible to generate a virtual viewpoint image without depending on the IBR and for example, it may also be possible to generate a virtual viewpoint image using model base rendering (MBR). The MBR is a method of generating a virtual viewpoint image by using three-dimensional shape data (3D model) of an object, which is generated based on a plurality of captured images obtained by capturing an object from a plurality of directions. The above-described MBR generates a virtual viewpoint image by utilizing the 3D model of an object, which is obtained by the three-dimensional shape restoration method, for example, such as the visual hull method. In a case where the information processing apparatus 201 generates a virtual viewpoint image by the MBR, for example, it may also be possible to generate a 3D model or texture information on the 3D model. The virtual viewpoint image generated by the IBR or MBR is stored in a storage device in the image format, for example, such as the MXF format (Material eXchange Format), and further compressed into, for example, the MPEG2 format. The data format described here is one example and an arbitrary image format and data compression method may be used. Further, it may also be possible not to perform encoding. The control apparatus 202 is, for example, an information processing apparatus generating virtual viewpoint information, typically such as a personal computer, smartphone, and tablet terminal. The control apparatus 202 has an input interface for a user to perform various operations including the operation of the virtual camera 110, such as a mouse, keyboard, joystick, and touch panel.

Figure 3:
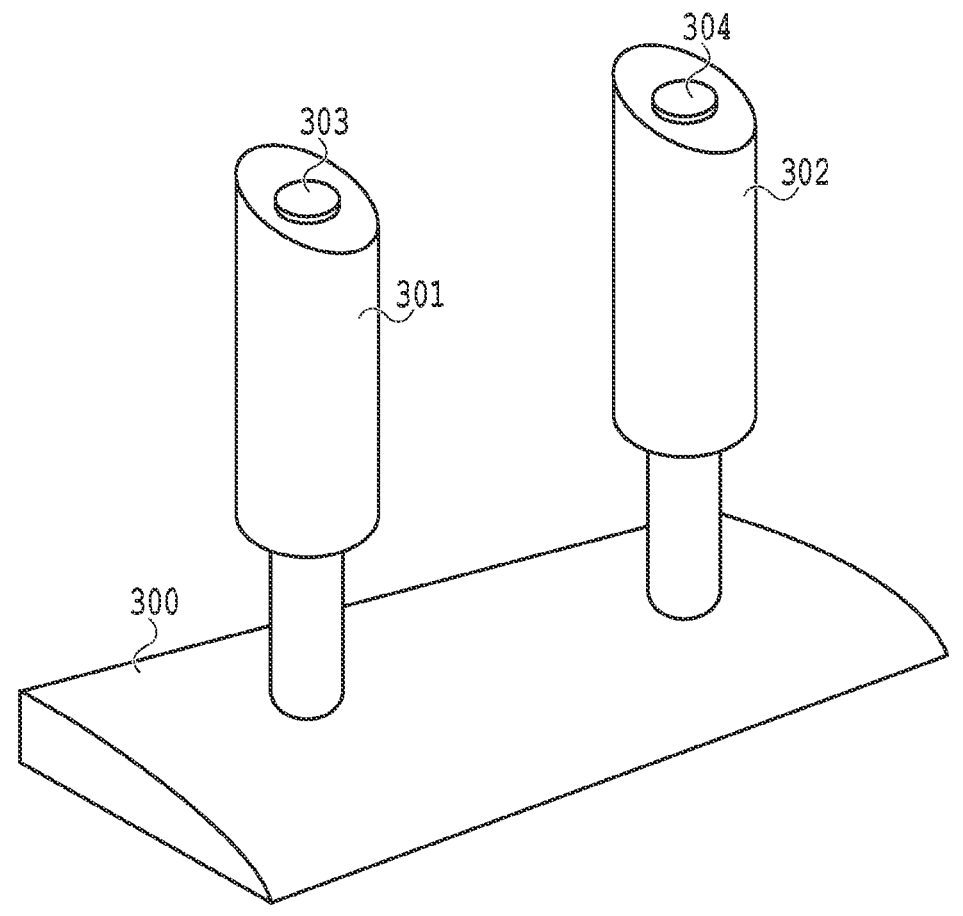
FIG. 3 is an explanatory diagram of a joy stick.

FIG. 3 is a diagram explaining a joystick as the input interface of the control apparatus 202. A joystick 300 includes a left stick 301, a right stick 302, a left button 303, and a right button 304. It is possible to input a direction with the joystick 300 by inclining the left stick 301 and the right stick 302 forward, backward, leftward, and rightward. The left stick 301 is a stick for controlling the position of the virtual camera 110. For example, by performing the operation to incline the left stick 301 forward, the virtual camera 110 moves forward, by performing the operation to incline the left stick 301 backward, the virtual camera 110 moves backward, by performing the operation to incline the left stick 301 in the leftward direction, the virtual camera 110 moves in the leftward direction, and by performing the operation to incline the left stick 301 in the rightward direction, the virtual camera 110 moves in the rightward direction. Further, by operating the left stick 301 in the state where the left button 303 is pressed, the mode switches into the mode in which the virtual camera 110 moves in the up-down direction. Then, by performing the operation to incline the left stick 301 forward, the virtual camera 110 moves in the upward direction and by performing the operation to incline the left stick 301 backward, the virtual camera 110 moves in the downward direction. The right stick 302 is a stick for controlling the orientation of the virtual camera 110. For example, by performing the operation to incline the right stick 302 forward and backward, it is possible to rotate the virtual camera 110 about the tilt axis and it is possible to perform the upward rotation by the operation to incline the right stick 302 forward and the downward rotation by the operation to incline the right stick 302 backward. Further, by performing the operation to incline the right stick 302 to left and right, it is possible to rotate the virtual camera 110 about the pan axis and it is possible to perform the leftward rotation by the operation to incline the right stick 302 in the leftward direction and the rightward rotation by the operation to inline the right stick 302 in the rightward direction. Furthermore, by performing the operation to incline the right stick 302 to left ant right in the state where the right button 304 is pressed, it is possible to rotate the virtual camera 110 about the roll axis and it is possible to perform the leftward rotation by the operation to incline the right stick 302 in the leftward direction and the rightward rotation by the operation to inline the right stick 302 in the rightward direction.

The control apparatus 202 generates information (virtual viewpoint information) indicating the position and orientation of the virtual camera 110 at an arbitrary time based on the operation signal of the joystick 300 and outputs the information to the information processing apparatus 201. The control apparatus 202 has the function to automatically correct the position and orientation of the virtual viewpoint identified by the operation signal based on structure data in a case of generating virtual viewpoint information. Details of the virtual viewpoint correction function will be described later.

<Hardware Configuration>

Figure 4:
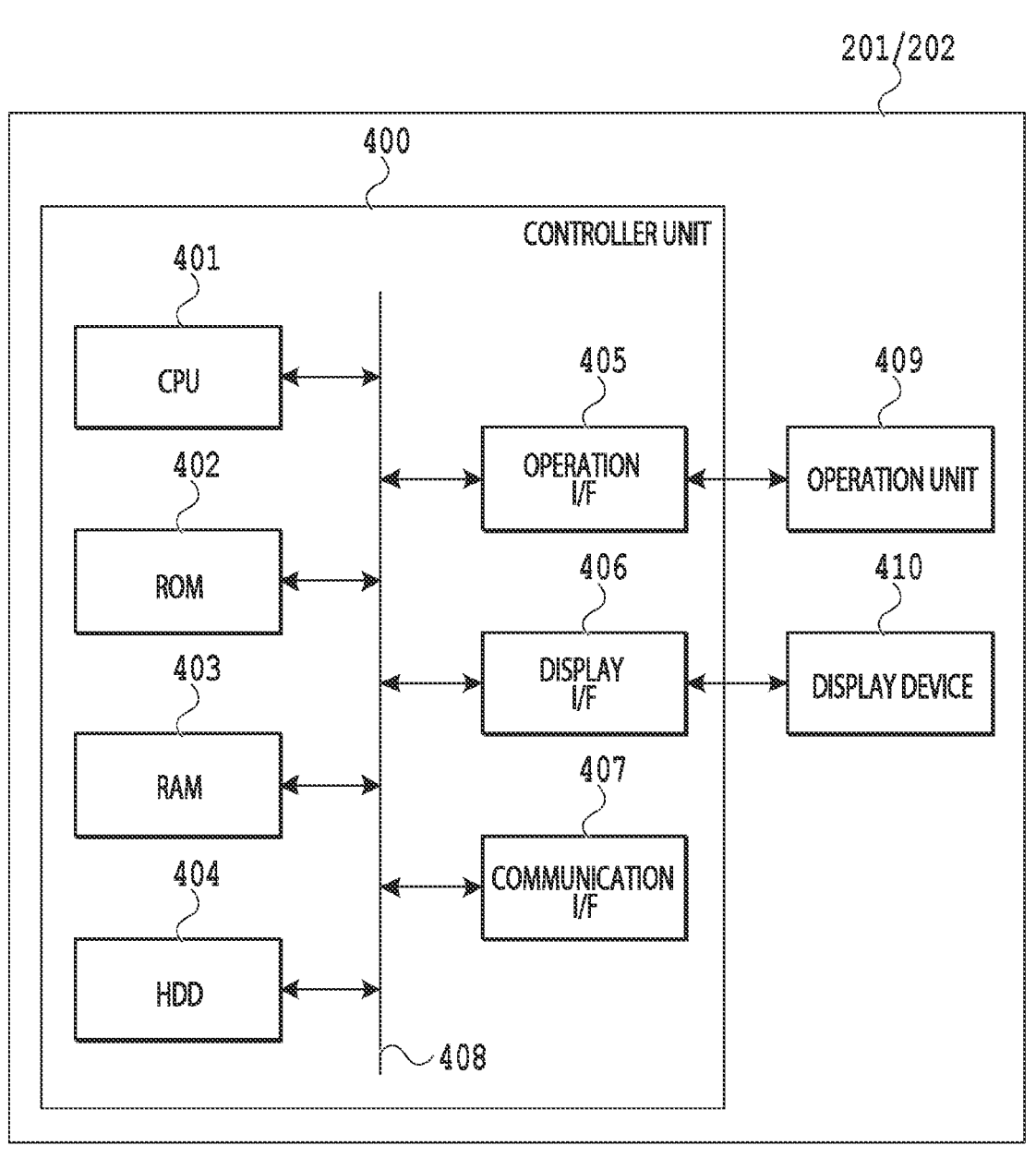
FIG. 4 is a diagram showing a hardware configuration example of an information processing apparatus and a control apparatus.

Following the above, a hardware configuration example of the information processing apparatus 201 and the control apparatus 202 is explained with reference to FIG. 4.

A controller unit 400 has a CPU 401, a ROM 402, a RAM 403, an HDD 404, an operation I/F (interface) 405, a display I/F 406, and a communication I/F 407. Each of these units is connected to one another via a system bus 408.

The CPU 401 controls the operation of the ROM 402, the RAM 403, the HDD 404, the operation I/F 405, the display I/F 406, and the communication I/F 407 via the system bus 408. The CPU 401 boots the OS by a boot program stored in the ROM 402. The CPU 401 executes an application stored, for example, in HDD 404 on the booted OS. By the CPU 401 executing the application program, various types of processing are implemented in the information processing apparatus 201 and the control apparatus 202, respectively. The RAM 403 is used as a temporary storage area, such as a main memory and a work area, of the CPU 401. The HDD 404 stores application programs and the like as described above. Further, the CPU 401 may include one processor or may include a plurality of processors.

The operation I/F 405 is an interface with an operation unit 409. The operation I/F 405 sends out information on the input operation by a user in the operation unit 409 to the CPU 401. The operation unit 409 has equipment capable of receiving a user operation, for example, such as a mouse, a keyboard, and a touch panel. The display I/F 406 is an interface with a display device 410. The display I/F 406 outputs, for example, data of an image to be displayed on the display device 410 to the display device 410. The display device 410 includes, for example, a liquid crystal display or the like and may have the touch panel function. In a case of a display having the touch panel function, the display device 410 also has the function of the operation unit 409.

The communication I/F 407 is an interface for performing communication, for example, such as Ethernet (registered trademark). The communication I/F 407 is connected to a transmission cable and includes a connector for receiving the transmission cable, and the like. The communication I/F 407 performs input and output of information with an external device via the transmission cable. The communication I/F 407 may be, for example, a circuit performing wireless communication, such as a baseband circuit or an RF circuit, or an antenna. Further, it is also possible for the controller unit 400 to cause the external display device 410 connected via a cable or a network to display an image. In this case, the controller unit 400 implements display control by outputting display data to the external display device 410. The hardware configuration shown in FIG. 4 is one example and part of the hardware configuration may be omitted, or a configuration not shown schematically may be added, or further, the configuration shown schematically may be combined. For example, the information processing apparatus 201 may not have the display device 410. For example, the above-described explanation is given on the assumption that the controller unit 400 has the CPU 401, but the controller unit 400 may have hardware, such as an ASIC, DSP, and FPGA, in place of the CPU 401 or in addition to the CPU 401. In that case, it may also be possible for the ASIC or DSP to perform part or the whole of the processing that is performed by the CPU 401.

<Function Configuration of Control Apparatus>

Figure 5:
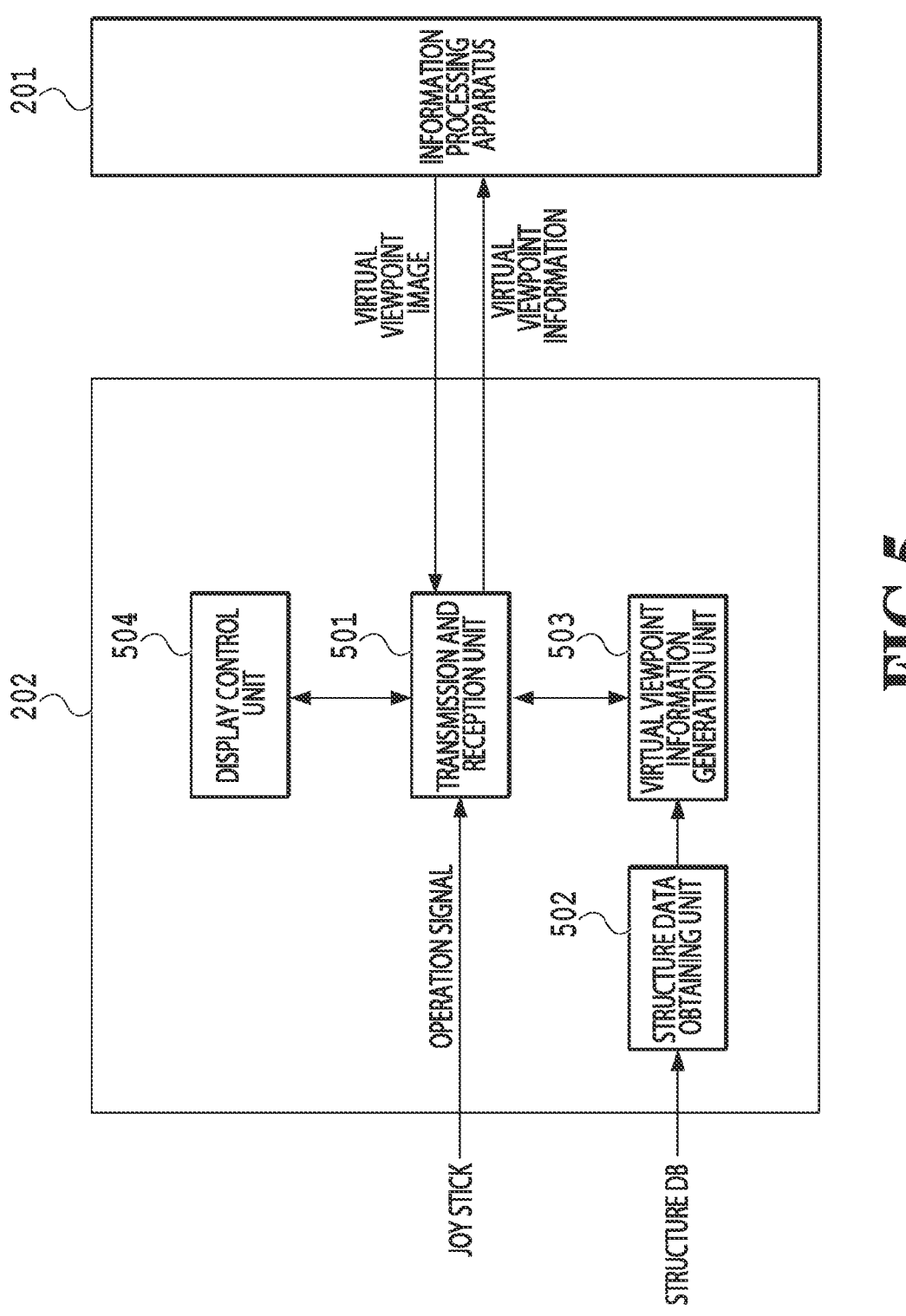
FIG. 5 is a block diagram showing a function configuration example of the control apparatus.

FIG. 5 is a block diagram showing a function configuration example of the control apparatus 202. The control apparatus 202 has a transmission and reception unit 501, a structure data obtaining unit 502, a virtual viewpoint information generation unit 503, and a display control unit 504. Each function unit shown in FIG. 5 is implemented, for example, by the CPU 401 of the control apparatus 202 reading various programs stored in the ROM 402 and performing control of each unit. In the following, each function unit is explained.

The transmission and reception unit 501 receives, for example, the operation signal of the joystick 300 by a user via the operation I/F 405. Each time a change in the position/orientation of the virtual viewpoint occurs by a user operating the joystick 300, the operation signal is generated and transmitted to the control apparatus 202. The received operation signal is output to the virtual viewpoint information generation unit 503. Further, the transmission and reception unit 501 transmits virtual viewpoint information generated by the virtual viewpoint information generation unit 503 to the information processing apparatus 201 via the communication I/F 407 and receives a virtual viewpoint image corresponding to the virtual viewpoint information from the information processing apparatus 201 via the communication I/F 407. The received virtual viewpoint image is displayed on a UI screen (in the following, called "virtual viewpoint setting screen") for setting a virtual viewpoint by the display control unit 504.

Figure 6A:
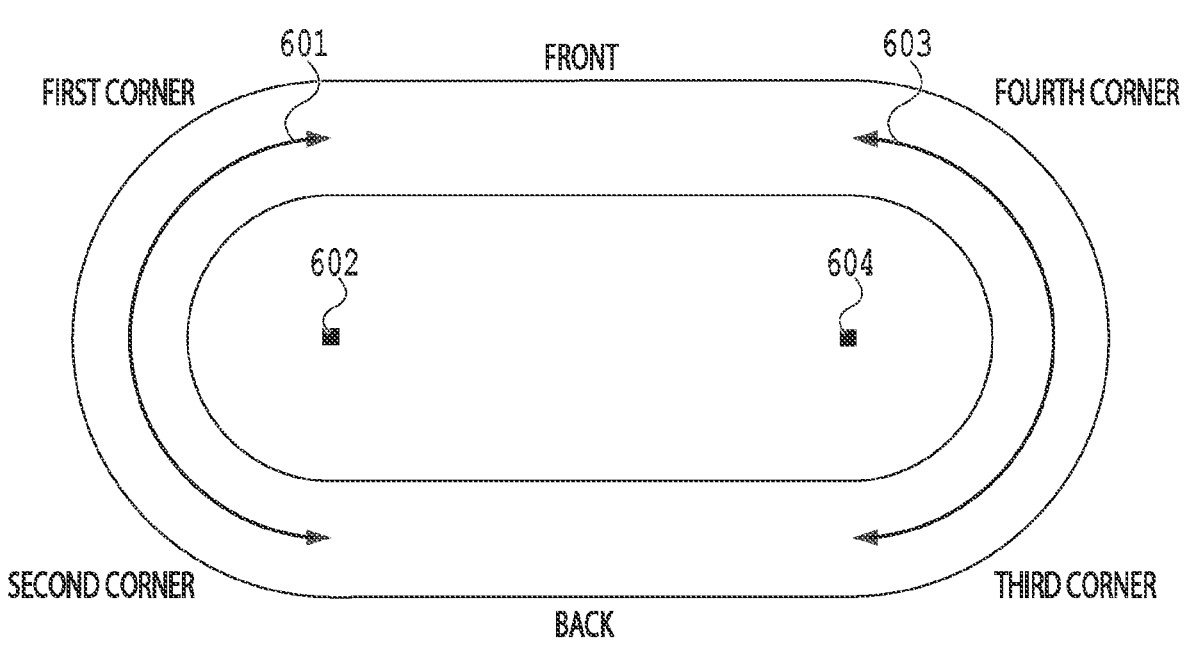
FIG. 6A and FIG. 6B are each a diagram showing one example of information included in structure data.
Figure 6B:
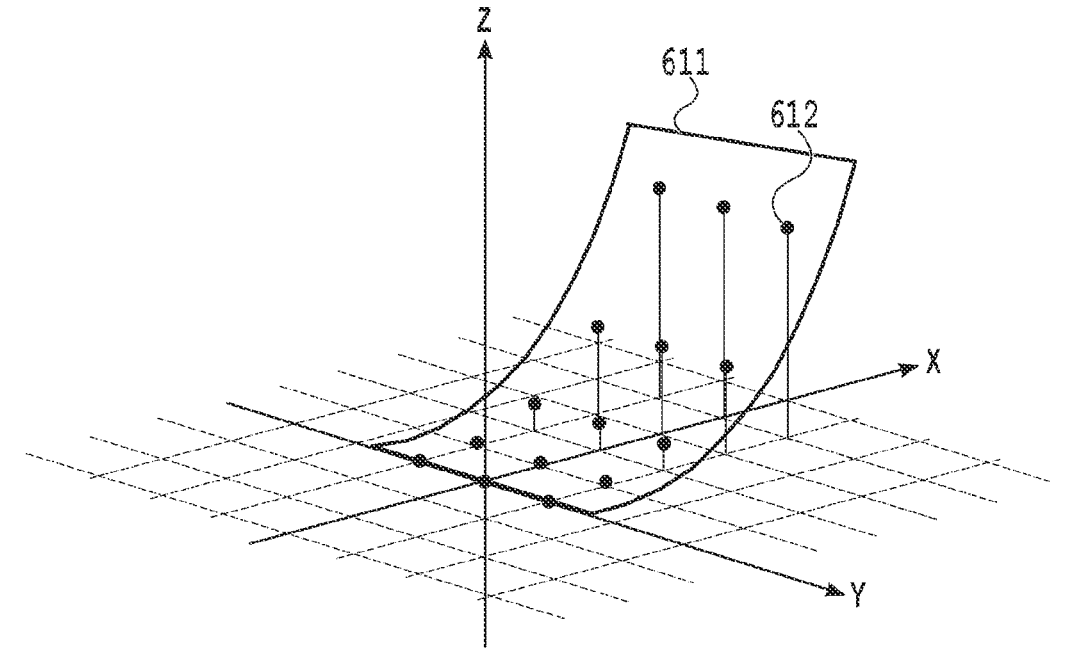

The structure data obtaining unit 502 reads and obtains data (in the following, called "structure data") capable of identifying the surface shape of a large structure existing in the image capturing space from the HDD 404 as a DB (database) storing the structure data. FIG. 6A and FIG. 6B are each a diagram showing one example of information included in the structure data of the bank 101. FIG. 6A is one example of two-dimensional data representing the whole shape of the bank 101 in a case where the bank 101 is viewed from a bird's eye directly above. In FIG. 6A, a two-directional arrow 601 in the shape of a semicircle indicates a curve section from the first corner to the second corner of the bank 101 and a point 602 indicates the center point of the curve section 601. Further, a two-directional arrow 603 in the shape of a semicircle indicates a curve section from the third corner to the fourth corner and a point 604 indicates the center point of the curve section 603. Information on the radius of curvature of the curve sections 601 and 603 and the position coordinates of the center points 602 and 604 is also included in the two-dimensional data. FIG. 6B is one example of three-dimensional data representing the shape of the maximum inclination portion in the curve section of the bank 101. The position coordinates indicating the heights of a plurality of points 612 on a curved surface 611 from the ground surface (heights from X-Y plane) are included in the three-dimensional data. In this case, the plurality of points 612 corresponds to grid points on the X-Y plane, respectively. For the convenience of explanation, explanation is given by using part of the curve section of the bank 101, but in the three-dimensional data, information on the whole bank 101 is included. It may also be possible to obtain the above-described structure data from the HDD 404 inside the control apparatus 202, or obtain from an external device (for example, external server comprehensively managing structure data) not shown schematically. The obtained structure data is output to the virtual viewpoint information generation unit 503.

The virtual viewpoint information generation unit 503 generates virtual viewpoint information based on the operation signal of the joystick 300 received from the transmission and reception unit 501. At this time, the virtual viewpoint information generation unit 503 also performs processing to automatically correct the virtual viewpoint information corresponding to the operation signal by using a camera path generated based on the structure data. Details of the generation processing of virtual viewpoint information, including this automatic correction, will be described later. The generated virtual viewpoint information is transmitted to the information processing apparatus 201 by the transmission and reception unit 501.

The display control unit 504 performs a variety of types of control relating to information that is displayed on the display device 410, such as display control of various UI screens including the above-described virtual viewpoint setting screen, via the display I/F 406.

<Generation Processing of Virtual Viewpoint Information>

Figures 7, 7A:
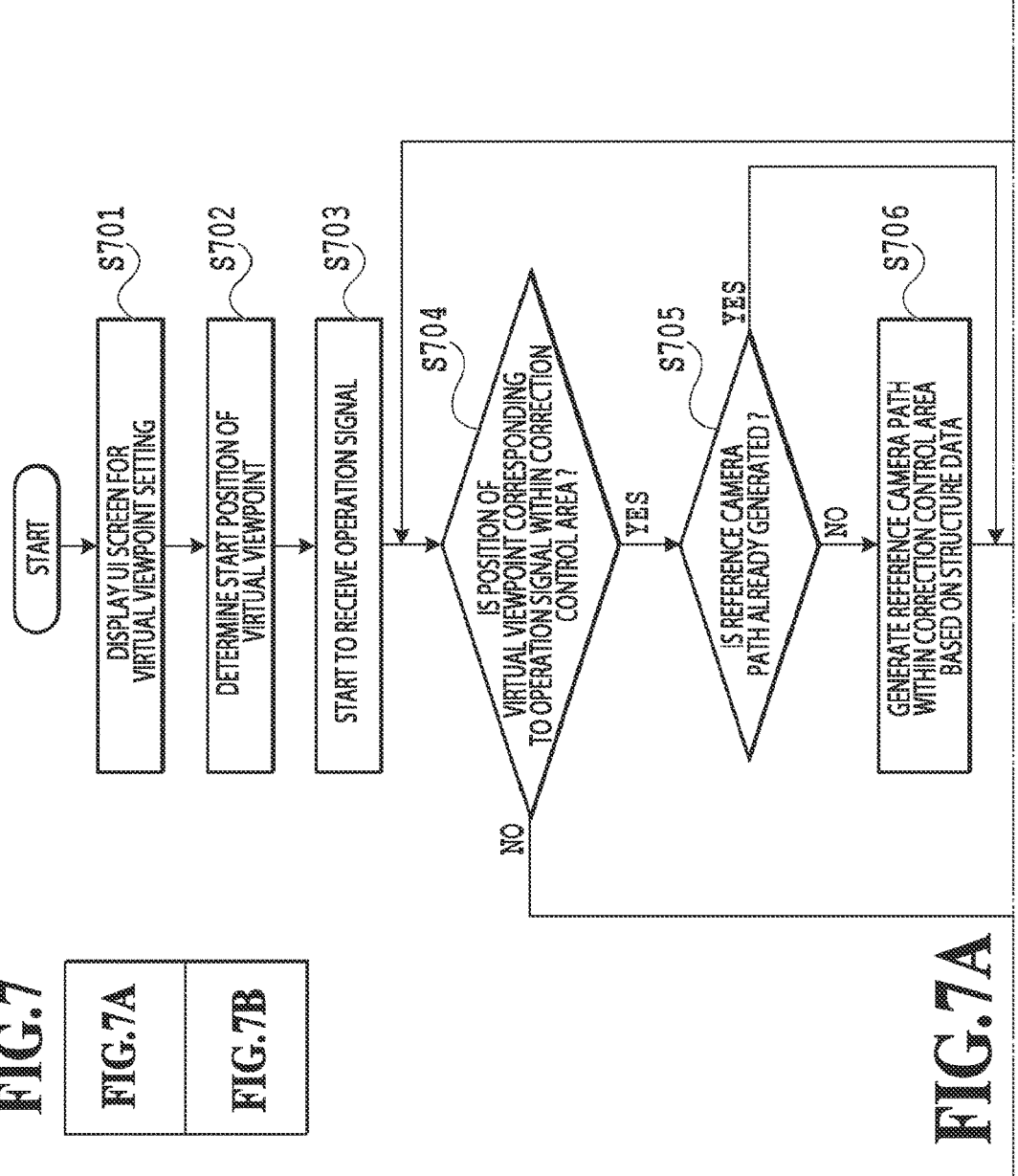
FIG. 7 is a diagram showing a relationship between FIGS. 7A and 7B, and FIGS. 7A and 7B are flowcharts showing a flow of processing to generate virtual viewpoint information.

Following the above, the generation processing of virtual viewpoint information in the control apparatus 202 is explained by taking a case as an example where a user continuously sets the position and orientation of a new virtual viewpoint in a time series by operating the joystick 300 while referring to a generated virtual viewpoint image. FIGS. 7A and 7B are flowcharts in a case where virtual viewpoint information is generated in real time according to the present embodiment. In the following, explanation is given with reference to the flowchart in FIGS. 7A and 7B. It is assumed that before the series of processing shown in the flowcharts in FIGS. 7A and 7B is started, structure data of the bank and the like existing in the image capturing space is obtained by the structure data obtaining unit 502 and loaded onto the RAM 403 and the state is brought about where the CPU 401 can refer to the structure data appropriately. In the following explanation, a symbol "S" means a step.

At S701, the display control unit 504 reads screen data of the virtual viewpoint setting screen (not shown schematically), which is prepared in advance, from the HDD 404 or the ROM 402 and displays the virtual viewpoint setting screen on the display device 410. On the basic screen that is displayed immediately after the generation processing starts, for example, a preview image in a case where the whole image capturing space is viewed from a bird's eye is displayed, which is for a user to designate the start position of the virtual viewpoint at next S702.

Figure 8:
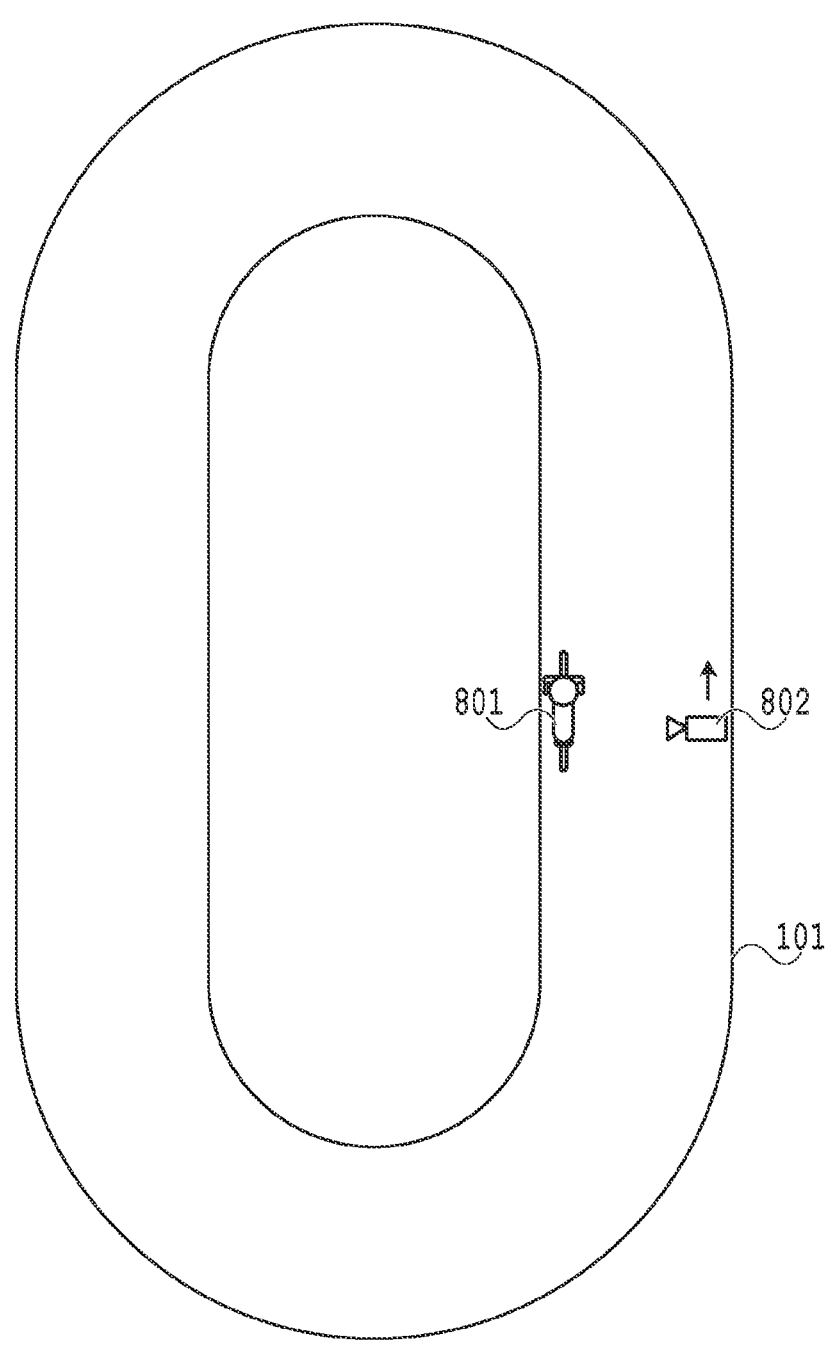
FIG. 8 is a diagram showing a state where a start position and a start orientation of a virtual viewpoint are designated.

At S702, the virtual viewpoint information generation unit 503 determines the start position and the start orientation of the virtual viewpoint based on user instructions input via the virtual viewpoint setting screen, FIG. 8 shows the state where the start position and the start orientation of the virtual viewpoint (virtual camera) are designated in the preview image displayed on the virtual viewpoint setting screen. In the example in FIG. 8, in the preview image from a bird's eye of the bank 101, the start position and the start orientation of a virtual camera 802 capturing a player 801 who goes around the bank 101 counterclockwise from the direct side (right lateral surface) of the side of the outer circumference of the bank are designated. In FIG. 8, only the start position on the X-Y plane is shown and information on the Z-axis is not shown, but it is assumed that, for example, the height of the line-of-sight of a person standing on the track surface is determined as the start position along the Z-axis. It is possible for a user to implement image capturing by the virtual camera 802 from the direct side while maintaining the initial positional relationship between the player 801 and the virtual camera 802 by performing the operation to incline the left stick 301 of the joystick 300 in the rightward direction in accordance with the movement of the player 801. In this case, as the player 801 running in the straight section of the bank 101 approaches the curve section, the virtual camera 802 also approaches the curve section.

At S703, the transmission and reception unit 501 starts to receive the operation signal that is transmitted at all times by the user continuously operating the joystick 300. The received operation signal is output to the virtual viewpoint information generation unit 503. It is assumed that the processing at next 704 and subsequent steps is performed for each frame. For example, in a case where image capturing is performed at 60 fps, it may also be possible to perform the processing for each frame, or at predetermined frame intervals, or it may also be possible to perform the processing at specific key frames and fill the blank frame by interpolation processing.

Figure 9:
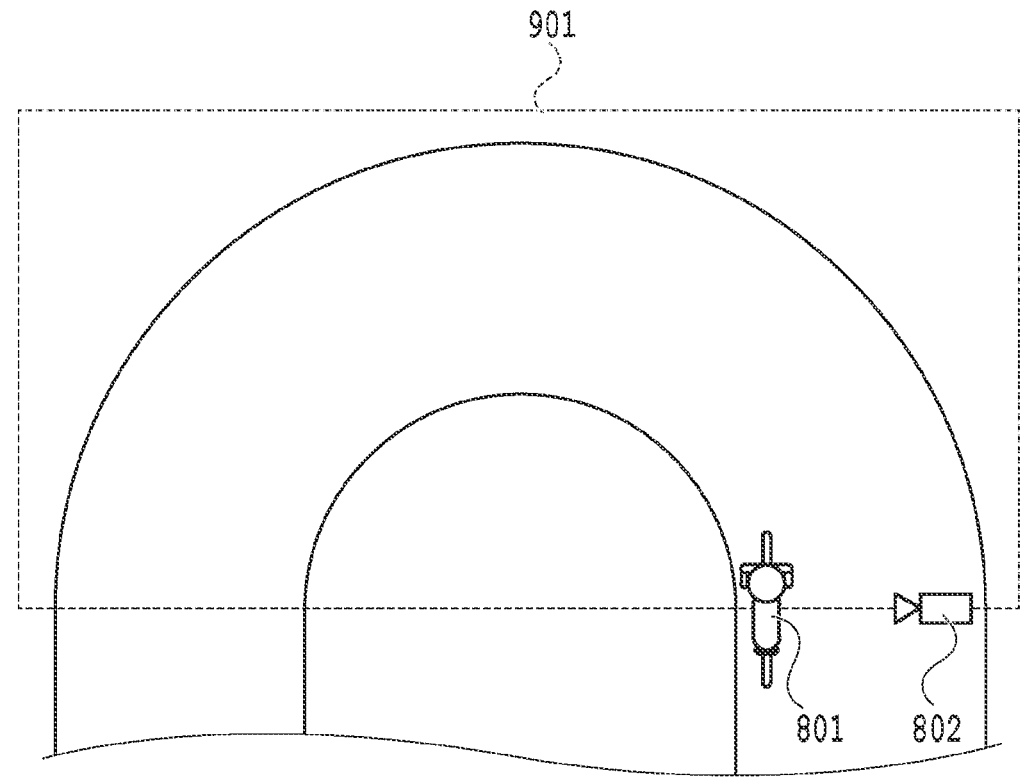
FIG. 9 is a diagram showing a state where the position of a virtual camera is included within a correction control area.

At S704, the virtual viewpoint information generation unit 503 determines whether or not the position of the virtual camera corresponding to the input operation signal in a case where the virtual camera is viewed from a bird's eye is included within a specific area (in the following, called "correction control area"), which is the target of correction control. FIG. 9 is a diagram showing the state where the position of the virtual camera is included within the correction control area, which is set by taking the curve section of the bank 101 as a target. The correction control area indicated by a broken line 901 in FIG. 9 is a rectangular area containing the curve section in which the inclination of the track gradually changes, which is set on the bird's-eye view of the bank 101. The inclination in the curve section is not constant and the inclination at the boundary portion with the straight section is the most gradual and the inclination at the middle point is the steepest. It may also be possible to set the correction control area 901 by, for example, a user manually setting in the preview image of the plane of the large structure displayed on the UI screen at the same time of the user determining the start position and the start orientation of the virtual camera. Alternatively, it may also be possible to set automatically by detecting the area in which the inclination changes based on the shape data of the large structure. In a case where the determination results indicate that the position of the virtual camera 802 corresponding to the input operation signal is included in the correction control area 901, the processing at S705 is performed next. Then, prior to the processing at S705, information relating to the user operation in a case where the virtual camera 802 comes to be included for the first time in (in a case where the virtual camera 802 enters for the first time) the correction control area is stored. For example, in a case of capturing the player 801 while moving the virtual camera 802 as to move in parallel to the player 801 as shown in FIG. 8, by the operation to incline the left stick 301 of the joystick 300 in the rightward direction, the virtual camera 802 is caused to move in the advancing direction. Because of this, in a case where the virtual camera 802 moves toward the correction control area 901 with this state maintained, information indicating that the operation to incline the left stick 301 in the rightward direction is the operation to cause the virtual camera 802 in the advancing direction is stored. On the other hand, in a case where the position of the virtual camera 802 corresponding to the input operation signal is not included in the correction control area 901, the processing at S710 is performed next.

Figure 10:
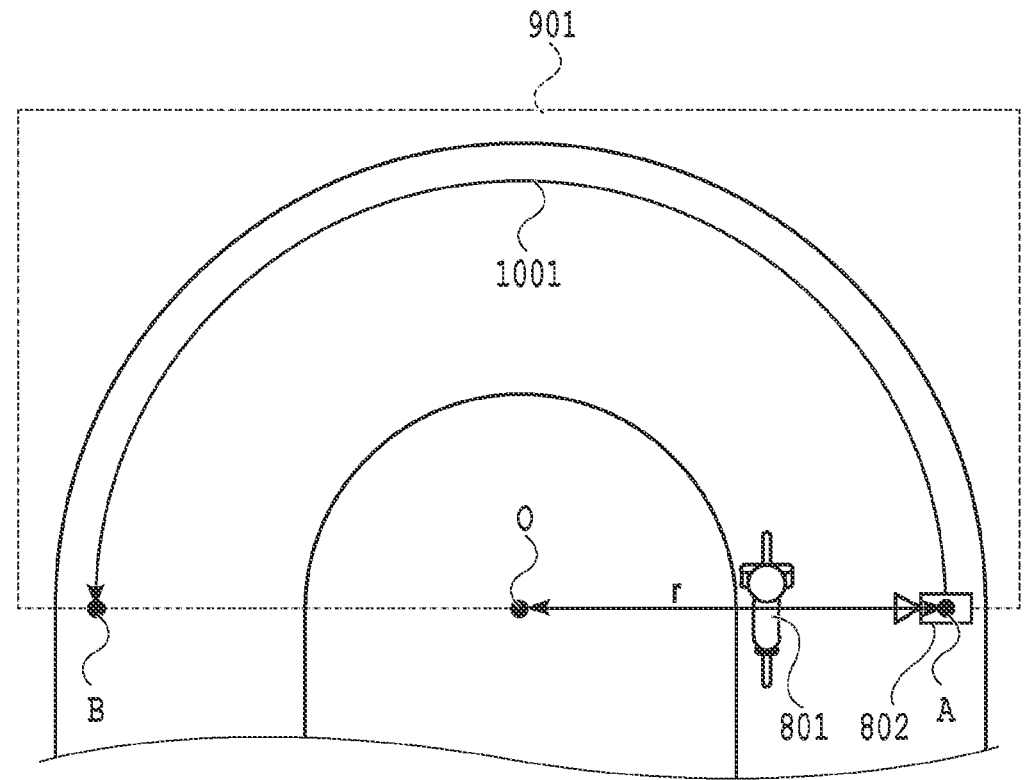
FIG. 10 is a diagram showing one example of a reference camera path.

At S705, the virtual viewpoint information generation unit 503 determines whether the reference camera path already exists. Here, the reference camera path is a camera path that is taken as a reference in the correction control area, which is referred to in a case where the position and orientation of the virtual viewpoint corresponding to the operation signal continuously input are corrected automatically. In the camera path, which is data defining the position and orientation of the virtual viewpoint continuously in a time series, the position of the virtual viewpoint at a certain time (in a certain frame) is indicated by three-dimensional coordinates in the work coordinate system and the orientation of the virtual viewpoint is indicated by the angle of each of the pan axis, the tilt axis, and the roll axis. FIG. 10 is a diagram showing one example of a movement path of the virtual viewpoint (virtual camera), which is set as the reference camera path, in a diagram in a case where the curve section of the bank 101 is viewed from directly above, that is, from a bird's eye. In FIG. 10, a solid-line arc 1001 represents the locus of movement in a case where the virtual camera 802 passes through the correction control area 901 and the locus is defined by two-dimensional coordinates on the X-Y plane in the world coordinate system. Further, a point O is the center point of the arc 1001 describing a semicircle and the position is defined by two-dimensional coordinates in the structure data. In a case where reference camera path such as this is not generated yet, next, the processing at S706 is performed next. On the other hand, in a case where the reference camera path is already generated, S706 is skipped and following this, the processing at S707 is performed.

At S706, the virtual viewpoint information generation unit 503 generates the reference camera path described above based on the structure data. In the following, detailed explanation is given by taking a case as an example where the reference camera path describing the arc 1001 shown in FIG. 10 described previously is generated.

<<Generation Method of Reference Camera Path>>

Figure 11:
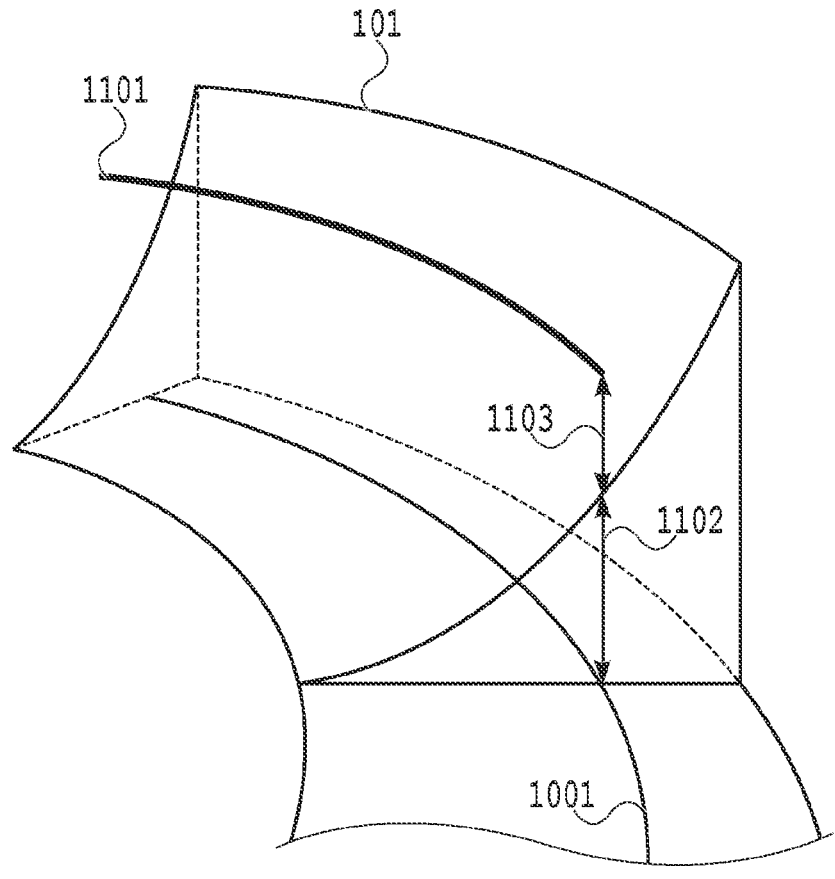
FIG. 11 is a diagram explaining the way height information (Z-coordinate) is attached to a two-dimensional movement path.

First, the movement path of the virtual camera 802 on the X-Y plane is determined. Specifically, a two-dimensional movement path is determined, which describes the semicircle 1001 whose starting point is taken to be a point A at which the virtual camera 802 enters the correction control area 901, whose endpoint is taken to be a point B at which the virtual camera 802 exits from the correction control area 901, and whose radius r is taken to be a straight line connecting the point A (or B) and the center point O. In the movement path determined here, a plurality of two-dimensional coordinates (x, y) corresponding to each point on the semicircle 1001 is included. In a case where the movement path of the virtual camera 802 on the X-Y plane is determined, next, the height of the virtual camera 802 on the movement path is determined. Specifically, for each of the two-dimensional coordinates (x, y) of each point on the determined two-dimensional movement path, a one-dimensional coordinate (z) representing the height from the ground surface is determined. FIG. 11 is a diagram explaining the way a Z-coordinate is added to the determined two-dimensional movement path 1001 as height information. In FIG. 11, an arc 1011 indicated by a thick line indicates a three-dimensional movement path obtained by adding height information to the two-dimensional movement path 1001. The value of the Z-coordinate representing the height that is added here is the total value of a height 1102 of the track surface of the bank 101 and a height 1103 of the virtual camera 802 from the track surface. The height 1102 of the track surface is the Z-coordinate in the three-dimensional coordinates obtained from the structure data by using the two-dimensional coordinates (x, y) corresponding to each point of the determined two-dimensional movement path 1001. Then, the height 1103 of the virtual camera 802 from the track surface is equal to the height from the ground surface to the virtual camera 802 at the point in time at which the virtual camera 802 enters the correction control area 901. That is, the height 1103 is the value obtained by subtracting the Z-coordinate obtained from the structure data based on the X- and Y-coordinates in the three-dimensional coordinates of the point at which the virtual camera 802 is located from the Z-coordinate of the three-dimensional coordinates at the time at which the virtual camera 802 enters the correction control area. In this manner, the three-dimensional movement path 1011 is determined.

Figure 12:
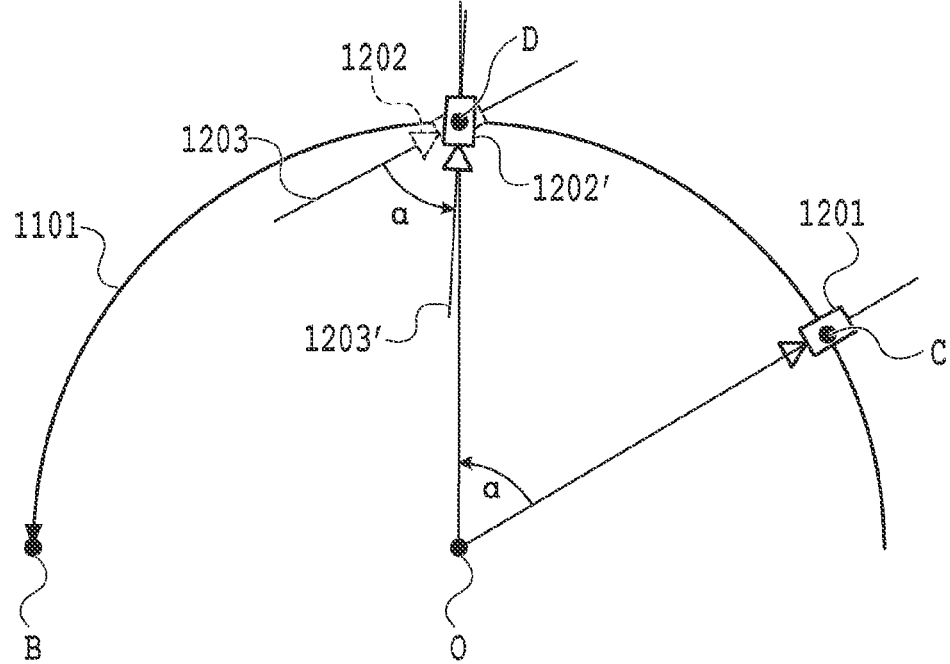
FIG. 12 is a diagram explaining a method of determining an angle of a pan axis of a virtual camera.
Figure 13:
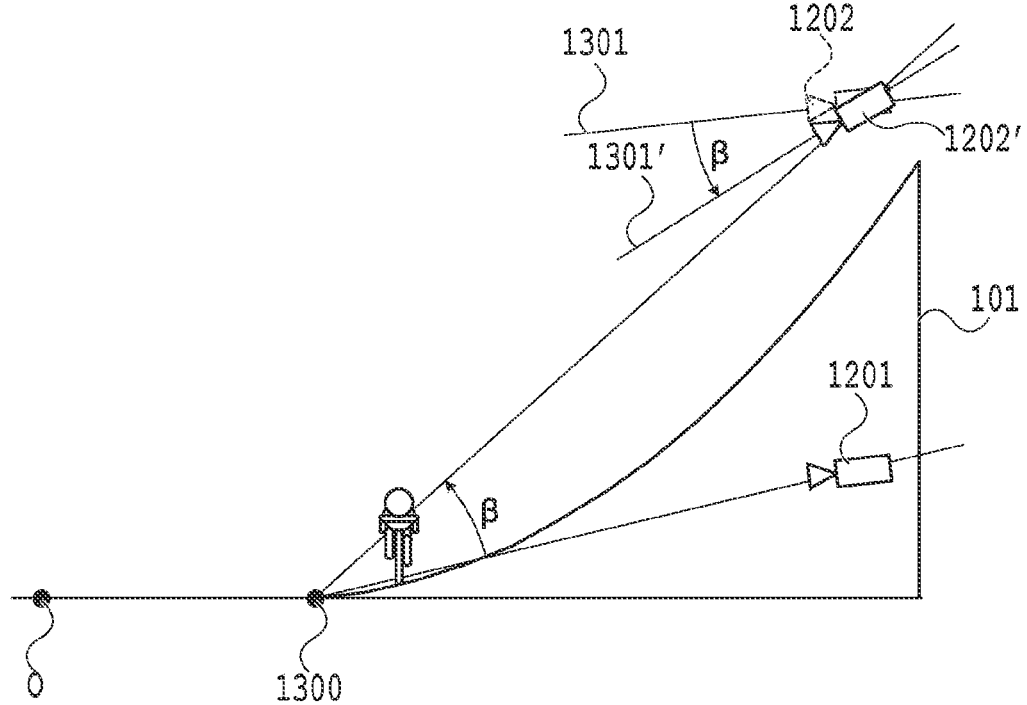
FIG. 13 is a diagram explaining a method of determining an angle of a tilt axis of a virtual camera.

In a case where the three-dimensional movement path is determined, next, the orientation of the virtual camera 802 at each point on the three-dimensional movement path, specifically, the angles of the pan axis, and the tilt axis are determined. FIG. 12 is a diagram explaining a method of determining the angle of the pan axis of the virtual camera 802 and FIG. 13 is a diagram explaining a method of determining the angle of the tilt axis. First, with reference to FIG. 12, the method of determining the angle of the pan axis is explained. In FIG. 12 in a case where the curve section of the bank 101 is viewed from a bird's eye viewpoint, a point C and a point D are positions on the movement path 1101 of the virtual camera 802 shown in FIG. 10 and FIG. 11 described previously. A solid-line virtual camera 1201 corresponding to the point C indicates the position and orientation of the virtual viewpoint at the point in time after the virtual camera 802 advances some distance from the point in time at which the virtual camera 802 enters the correction control area 901 and a broken-line virtual camera 1202 corresponding to the point D indicates the position and orientation of the virtual viewpoint in a case where the virtual camera 802 has advanced to the position at which the inclination is the steepest. Then, a solid-line virtual camera 1202' indicates the orientation of the virtual viewpoint after the pan axis of the broken-line virtual camera 1202 is modified. In a case where the angle of the pan axis in the virtual camera 1202 is determined, an angle $\alpha$ in a case where the virtual camera 1201 moves to the virtual camera 1202 is calculated. The angle $\alpha$ is the angle formed by two straight lines, that is, the straight line connecting the center point O of the reference camera path 1101, which is a semicircle, and the virtual camera 1201, and the straight line connecting the center point O and the virtual camera 1202. Based on the calculated angle $\alpha$, the pan axis of the virtual camera 1202 is modified. Specifically, the virtual camera 1202 is rotated in the leftward direction by an amount corresponding to the angle $\alpha$ by taking the pan axis of the virtual camera 1202 as the axis. Due to this, an optical axis 1203 of the virtual camera 1202 is changed to an optical axis 1203'. The solid-line virtual camera 1202' indicates the orientation of the virtual viewpoint whose optical axis is changed to the optical axis 1203'. Following this, the method of determining the angle of the tilt axis is explained with reference to FIG. 13. Here, in FIG. 13, which is a cross-sectional diagram in a case where the curve section of the bank 101 is cut vertically, the solid-line virtual camera 1201 corresponding to the point C in FIG. 12 and the broken-line virtual camera 1202 corresponding to the point D are shown. Then, in FIG. 13, the solid-line virtual camera 1202' indicates the orientation of the virtual viewpoint after the tilt axis of the broken-line virtual camera 1202 is modified. In a case where the angle of the tilt axis in the virtual camera 1202 is determined, an angle $\beta$ in a case where the virtual camera 1201 moves to the virtual camera 1202 is calculated. The angle $\beta$ is the angle formed by two straight line, that, is the straight line connecting a point representing an inside diameter 1300 of the track of the bank 101 and the virtual camera 1201 and the straight line connecting the point representing the inside diameter 1300 and the virtual camera 1202. Based on the calculated angle $\beta$, the tilt axis of the virtual camera 1202 is modified. Specifically, the virtual camera 1202 is rotated in the downward direction (direction toward the ground surface) by an amount corresponding to the angle $\beta$ by taking the tile axis of the virtual camera 1202 as the axis.

Due to this, an optical axis 1301 of the virtual camera 1202 is changed to an optical axis 1301'. The solid-line virtual camera 1202' indicates the orientation of the virtual camera whose optical axis 1301 is changed to the optical axis 1301'. In a case where the angle β is calculated, explanation is given by using the point indicating the inside diameter 1300 of the bank, but this is not limited and for example, it may also be possible to perform calculation by taking another point as a reference, such as the center point O of the bank.

As above, the reference camera path is generated based on the structure data. Explanation is returned to the flowcharts in FIGS. 7A and 7B.

At S707, the virtual viewpoint information generation unit 503 corrects the two-dimensional coordinates (x, y) representing the position on the X-Y plane of the virtual viewpoint corresponding to the input operation signal based on the reference camera path.

At S708, the virtual viewpoint information generation unit 503 corrects the one-dimensional coordinate (z) representing the position (height) on the Z-axis of the virtual viewpoint corresponding to the input operation signal based on the reference camera path.

At S709, the virtual viewpoint information generation unit 503 corrects the angles of the pan axis and the tilt axis, which identify the orientation of the virtual viewpoint corresponding to the input operation signal based on the reference camera path.

At S710, the transmission and reception unit 501 transmits virtual viewpoint information including the position and orientation of the virtual viewpoint corresponding to the input operation signal, or the position and orientation of the virtual viewpoint corrected at S707 and S709 described above to the information processing apparatus 201. The information processing apparatus 201 generates a virtual viewpoint image in accordance with the received virtual viewpoint information and transfers the completed virtual viewpoint image to the control apparatus 202.

At S711, the display control unit 504 displays the virtual viewpoint image that the transmission and reception unit 501 has received from the information processing apparatus 201 on the UI screen on the display device 410 via the display I/F 406.

At S712, whether or not to terminate the generation of the virtual viewpoint image is determined. In a case where instructions to terminate the generation of the virtual viewpoint image are input by a user, and so on, this processing is terminated. On the other hand, in a case where the generation of the virtual viewpoint image is continued, the processing returns to S704 and the processing is continued.

The above is the flow of the processing in a case where the virtual viewpoint information is generated in real time in the control apparatus 202. It may also be possible to adopt a configuration in which it is possible to set ON/OFF of the correction function in the virtual viewpoint information generation unit 503. For example, it is made possible for a user to set whether to use the correction function by operating a button to set ON/OFF of the correction function, which is provided on the joystick 300. It may also be possible to enable control of ON/OFF of the automatic correction of the virtual viewpoint as described above. Further, in the example described above, on the condition that the virtual viewpoint outside the correction control area comes to be included in the correction control area, the generation of the reference camera path is started. However, in the stage where it is predicted that the virtual viewpoint enters the correction control area from the outside of the correction control area based on the input operation signal, it may also be possible to start the generation of the reference camera path by taking the point at which the virtual viewpoint is predicted to enter the correction control area as the starting point. Further, the start position of the virtual viewpoint may be within the correction control area from the beginning. For example, it is assumed that the start position of the virtual viewpoint is designated within the correction control area 901 corresponding to the curve section described previously. In this case, first, a circle whose radius r is the straight line connecting the designated start position and the center point O is determined and a two-dimensional movement path is determined, which describes a semicircle whose starting point and endpoint are the positions, respectively, at which the determined circle crosses the outer edge of the correction control area 901. Then, the height on the determined two-dimensional movement path is determined and the resultant three-dimensional movement path is taken as the reference camera path.

<Specific Example of Correction Based on Reference Camera Path>

Here, how the position and orientation of the virtual viewpoint corresponding to the input operation signal are corrected based on the reference camera path is explained by using a specific example. Here, it is assumed that the degree of inclination of the left stick 301 and the movement distance of the virtual viewpoint (virtual camera) are associated with each other and the greater the degree of inclination, the greater the movement distance is.

Specific Example 1

It is assumed that the contents represented by the input operation signal are the operation to incline the left stick 301 in the rightward direction. Originally, by this operation, the virtual camera moves in the leftward direction, and therefore, in FIG. 9 and FIG. 10, the virtual camera moves in the directly upward direction. However, in a case of the present embodiment, the correction is performed, which moves the virtual viewpoint position toward the advancing direction on the movement path in the reference camera path by the amount corresponding to the movement distance in accordance with the degree of inclination of the left stick 301. Then, the orientation information at the corrected virtual viewpoint position on the movement path in the reference camera path is obtained and the correction to take the orientation predefined by the obtained orientation information as the orientation at the corrected virtual viewpoint position is performed.

Specific Example 2

It is assumed that the contents represented by the input operation signal are the operation to incline the left stick 301 in the leftward direction. Originally, by this operation, the virtual camera moves in the rightward direction, and therefore, in FIG. 9 and FIG. 10, the virtual camera moves in the directly downward direction (direction exactly opposite to the direction in which the player advances). However, in a case of the present embodiment, the correction is performed, which moves the virtual viewpoint position in the direction opposite to the advancement direction (so that the virtual viewpoint position goes back) on the movement path in the reference camera path by the amount corresponding to the movement distance in accordance with the degree of inclination of the left stick 301. Then, the orientation information at the corrected virtual viewpoint position on the movement path in the reference camera path is obtained and the correction to take the orientation predefined by the obtained orientation information as the orientation at the corrected virtual viewpoint position is performed.

Specific Example 3

It is assumed that the contents represented by the input operation signal are the operation to incline the left stick 301 forward while inclining the left stick 301 in the rightward direction. Originally, by this operation, the virtual camera moves forward while moving in the leftward direction, and therefore, in FIG. 9 and FIG. 10, the virtual camera moves in the diagonally upper-leftward direction. However, in a case of the present embodiment, the correction is performed, which advances the virtual viewpoint position in the direction perpendicular to the advancement direction with the current virtual viewpoint position as a reference by the amount corresponding to the movement distance in accordance with the degree of inclination of the left stick 301 (that is, the virtual camera 802 approaches the player 801). In a case where the contents represented by the input operation signal are the operation to incline the left stick 301 backward while inclining the left stick 301 in the rightward direction, the correction opposite to the above-described correction, that is, the correction is performed, which causes the virtual viewpoint position to go back in the direction perpendicular to the advancement direction (the virtual camera 802 goes away from the player 801). Further, the orientation at the corrected virtual viewpoint position is determined as in <<Specific example 1>> and <<Specific Example 2>> described above.

Specific Example 4

It is assumed that the contents represented by the input operation signal are the operation to incline the right stick 302 forward while inclining the left stick 301 in the rightward direction. In this case, for the virtual viewpoint position, the same processing as that in <<Specific Example 1>> described above is performed. Further, for the orientation of the virtual camera, the orientation information at the corrected virtual viewpoint position on the movement path in the reference camera path is obtained and the correction is performed, which rotates the tilt axis in the upward direction by the amount in accordance with the degree of inclination of the right stick 302 by taking the orientation predefined by the orientation information as a reference.

Modification Example

Figure 14:
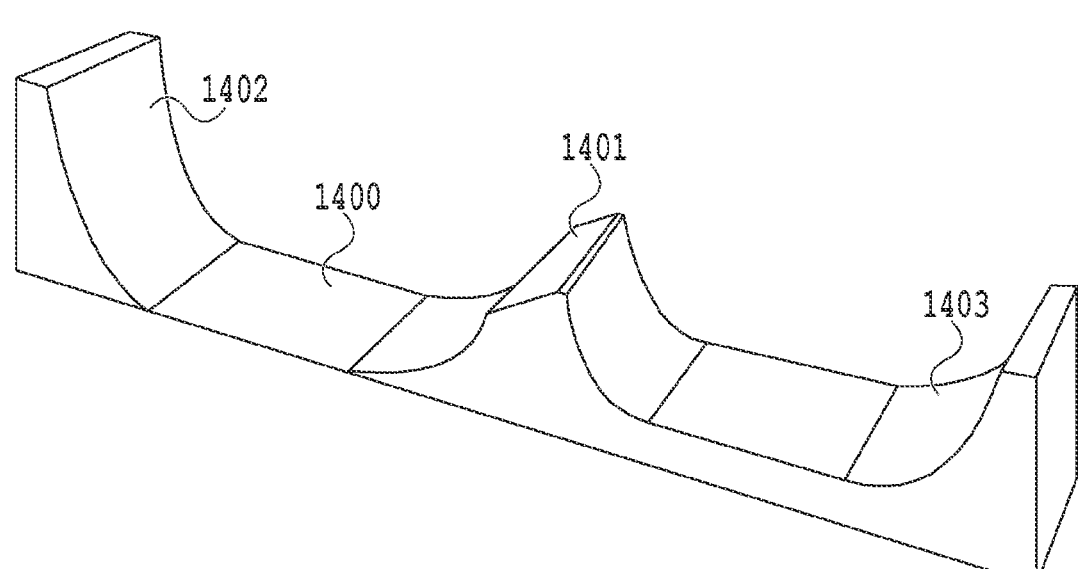
FIG. 14 is a diagram showing one example of a course used in a park competition of BMX free style.
Figure 15:
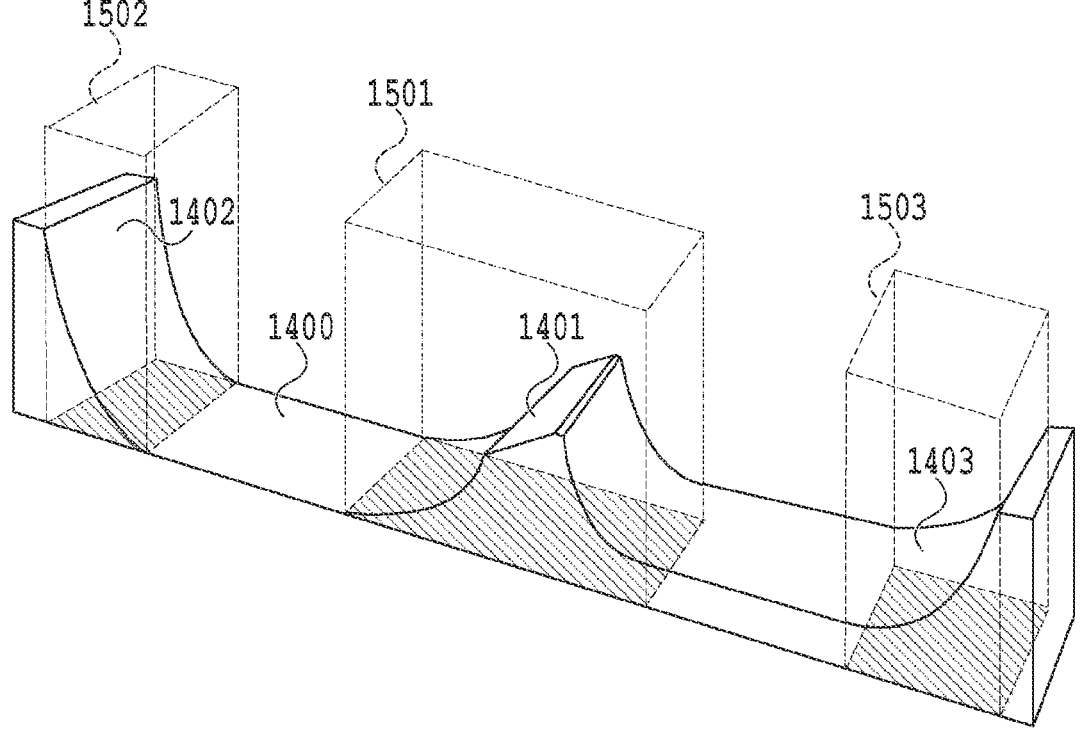
FIG. 15 is a diagram showing the position of a correction control area set within the course of a park competition.

In the embodiment described above, explanation is given by taking the tack competition of bicycle as an example, but the application target is not necessarily limited to this. For example, it is also possible to similarly apply the present embodiment to the game of another sport, which is played on a course including a curved portion, such as the park competition of BMX (Bicycle Motocross) free style and the half-pipe competition of snowboard. Further, it is also possible to similarly apply the present embodiment to the live of an artist, the performance of a concert or the like, which is performed in a specially shaped hall or the like. FIG. 14 is one example of the course that is used for the park competition of BMX free style, showing the state in a case where the course is viewed from the viewpoint of a bird's eye diagonally above. The BMX free style is the competition in which players compete the degree of difficulty and originality of a skill by performing the skill, such as jump and trick, on a variety of obstacles. A course 1400 shown in FIG. 14 includes three obstacles (spine 1401 and quarter ramps 1402 and 1403). Here, each parallelepiped whose base is the bottom of each obstacle (area indicated by slashes), which is indicated by a broken line in FIG. 15, is set for the course 1400 as each of correction control areas 1501 to 1503. The shape of the correction control area is not limited to the parallelepiped and may be the shape of another polyhedron.

Figure 16:
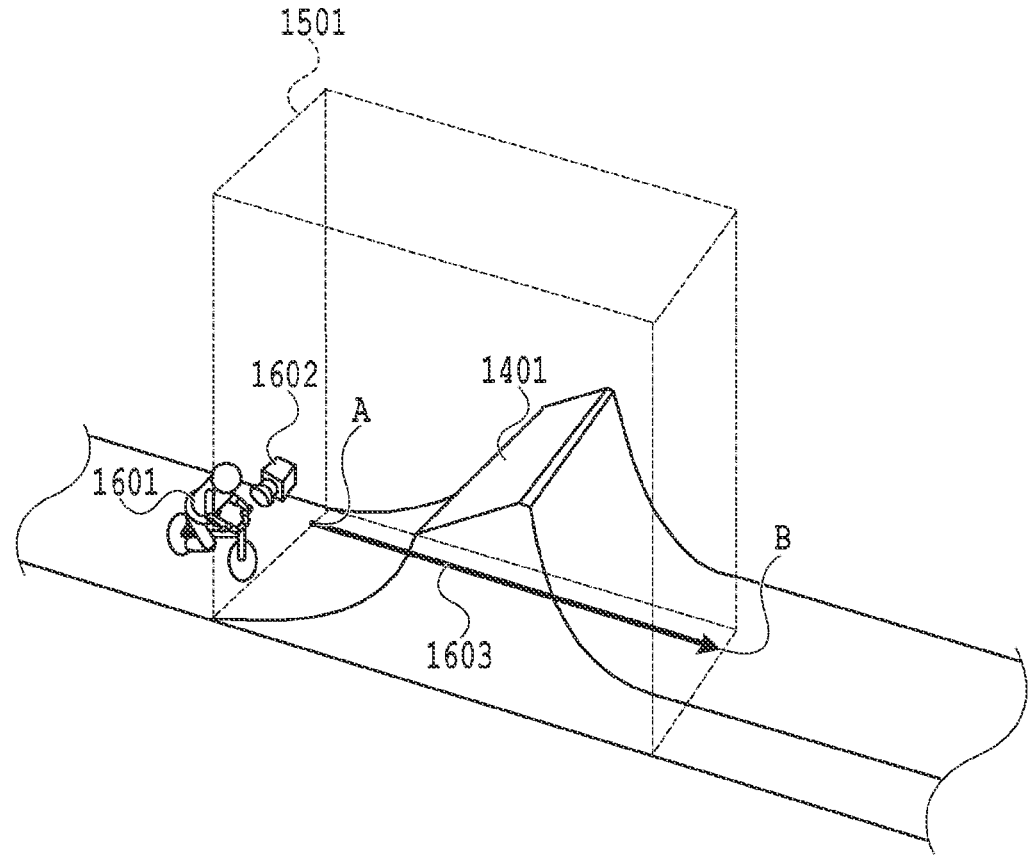
FIG. 16 is a diagram showing a two-dimensional movement path of a virtual camera in a correction control area of a spine.

The virtual viewpoint information generation unit 503 determines the movement path (reference camera path) of the virtual camera that moves within the correction control area at the instant the virtual camera enters the correction control areas 1501 to 1503. FIG. 16 is a diagram showing a two-dimensional movement path of the virtual camera in the correction control area 1501 set for the spine 1401. Here, a player 1601 is moving toward the spine 1401 and a virtual camera 1602 captures the player 1601 from the direct side while following the movement of the player 1601. The virtual viewpoint information generation unit 503 first determines a two-dimensional movement path in a case where the virtual camera 1602 passes through the inside of the correction control area 1501 at the instant the virtual camera 1602 enters the correction control area 1501. In FIG. 16, a thick-line arrow 1603 indicates the determined two-dimensional movement path. Here, the movement path 1603 is a straight line connecting an A point at which the virtual camera 1602 enters the correction control area 1501 and a B point located ahead in the movement direction immediately before the virtual camera 1602 enters the correction control area 1501 and includes two-dimensional coordinates (x, y) of each point on the straight line.

Figure 17:
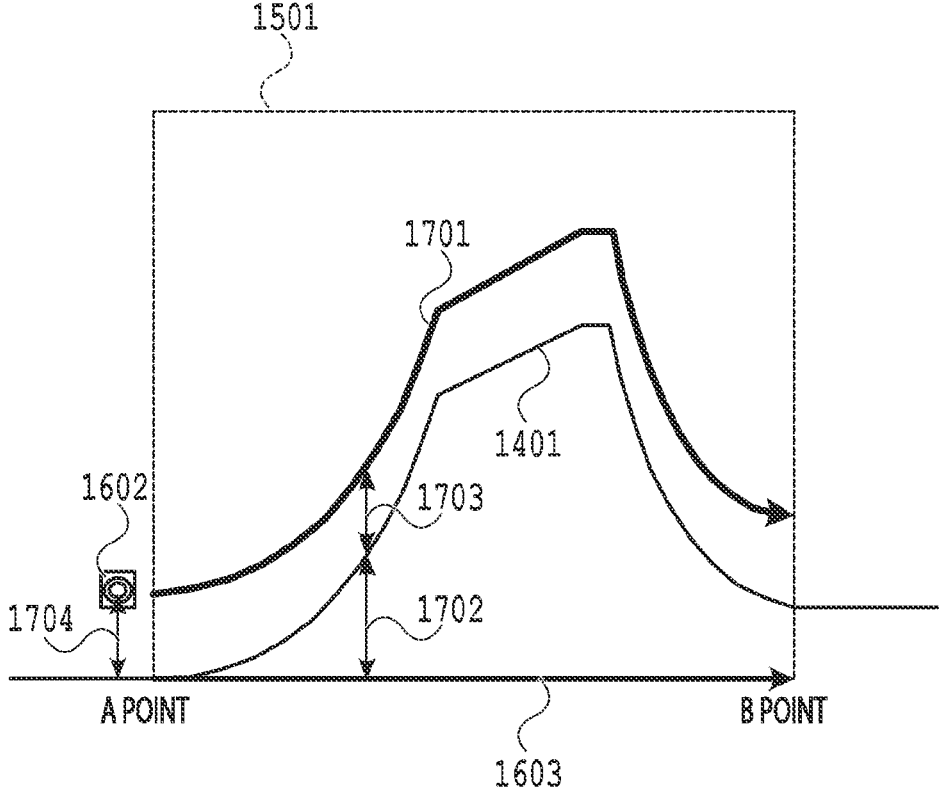
FIG. 17 is a diagram showing a three-dimensional movement path of a virtual camera in the correction control area of the spine.

Next, the virtual viewpoint information generation unit 503 determines a one-dimensional coordinate (z) indicating the height from the ground surface for each of the two-dimensional coordinates (x, y) of each point on the movement path 1603. FIG. 17 is a cross-sectional diagram in a case where the spine 1401 cut vertically is viewed from the side and explains the way the Z-coordinate is added as height information to the two-dimensional movement path 1603. In FIG. 17, a thick-line arrow 1701 indicates a three-dimensional movement path obtained by adding height information to the two-dimensional movement path 1603. The value of the Z-coordinate that is added here is the value obtained by adding the "height of the track surface of the spine 1401" indicated by a two-directional arrow 1702 and the "height of the virtual camera 1602 from the track surface" indicated by a two-dimensional arrow 1703. Here, the height 1702 of the track surface is the Z-coordinate in the three-dimensional coordinates obtained from the structure data by using the two-dimensional coordinates (x, y) corresponding to each point of the two-dimensional movement path 1603. Then, the height 1703 of the virtual camera 1602 from the track surface is equal to the height of the virtual camera 1602 from the ground surface at the point in time at which the virtual camera 1602 enters the correction control area 1501, which is indicated by a two-directional arrow 1704 in FIG. 17. In this manner, the three-dimensional movement path 1701 is determined. The generation of the movement path in the correction control area 1501 of the spine 1401 is explained, but for the quarter ramp 1402 and the quarter ramp 1403, it is also possible to generate the movement path by the same method.

For the three-dimensional movement path that is generated for the course 1400 shown in FIG. 14, the process to determine the orientation of the virtual camera 1602 at each point on the path is not necessary. There are two major reasons for this. One reason is that the two-dimensional movement path 1603 serving as the basis of the three-dimensional movement path is straightforward and does not describe an arc (see FIG. 16), and therefore, it is sufficient to maintain the angle of the pan axis at the point in time at which the virtual camera 1602 enters the correction control area and it is not necessary to modify the pan axis despite the elapse of time. The other reason is that in the example described above, it is possible to set the virtual camera so as to capture the player 1601 from the direct side at all times in accordance with the movement of the player 1601 without the need to change the angle of the tilt axis in the generated three-dimensional movement path 701. Consequently, as the orientation of the virtual camera 1602, the orientation at the point in time at which the virtual camera 1602 enters the correction control area 1501 is maintained. In the example described above, although the process to determine the orientation of the virtual camera at each point on the three-dimensional movement path is no longer necessary, it may also be possible to modify or change the orientation of the virtual camera at each point on the path. In that case, for example, it may also be possible to enable a user to select whether to change the orientation of the virtual camera 1602 within the correction control area 1501 and receive the operation to change the orientation in accordance with the selection of the user. In this case, it may also be possible to enable a user to select whether to change the orientation for each correction control area, or for all the correction control areas as the target at one time.

Further, in the embodiment described above, explanation is given by taking a case as an example where it is desired to keep the height from the ground surface (track surface) constant, but it is also possible to similarly apply the present embodiment to a scene in which, for example, it is desired to keep the distance to the ceiling or the sidewall constant. Specifically, it is also possible to generate a reference camera path based on structure data of a tunnel whose height of the ceiling is not constant and obtain a camera path along which the virtual camera moves in parallel to a person walking within the tunnel while keeping the distance from the ceiling constant based on the reference camera path.

Further, in the embodiment described above, explanation is given by taking a case as an example where virtual viewpoint information for a virtual viewpoint image based on a plurality of images obtained by a plurality of imaging devises capturing a real three-dimensional space is generated, but this is not limited. For example, it is also possible to apply the present embodiment to the generation of virtual viewpoint information for a virtual viewpoint image in a game or metaverse, in which a character of a person, an animal or the like moves within a virtual three-dimensional space generated by computer graphics and not existing actually.

Further, in the embodiment described above, the position and orientation of the virtual viewpoint are corrected based on the reference camera path, but this is not limited. For example, it may also be possible to limit the position of the virtual viewpoint so that the position of the virtual viewpoint is the position on the reference camera path. In a case where the contents represented by the input operation signal are the operation to incline the left stick 301 forward, in FIG. 9 and FIG. 10, the operation serves as the input causing movement toward the center point O, but the input is not reflected because of not being the position on the reference camera path 1001.

As above, according to the present embodiment, in a case where it is desired to move the virtual viewpoint in parallel to an object moving along a large structure whose shape is complicated, it is possible to maintain the distance between the surface of the large structure and the virtual viewpoint constant without the need to perform a complicated operation. Due to this, it is possible for a user to obtain a natural camera path desired by the user by a simple operation.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in a case where a large structure whose shape is complicated exists in a three-dimensional space, it is possible to obtain a desired camera path by a simple operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2023-026039, filed Feb. 22, 2023, and No. 2023-191402, filed Nov. 9, 2023 which are hereby incorporated by reference wherein in their entirety.

What is claimed is:

1. A control apparatus comprising:
   one or more memories storing instructions; and
   one or more processors executing the instructions to perform:
   obtaining shape data representing a shape of a structure existing in a three-dimensional space;
   receiving an operation signal controlling a virtual viewpoint for generating a virtual viewpoint image; and
   generating virtual viewpoint information indicating a position and orientation of a virtual viewpoint identified based on the operation signal, wherein

19 in the generating:

a camera path indicating a movement path of a virtual viewpoint in a specific area in the three-dimensional space is determined based on the shape data of the structure; and in a case where a position of a virtual viewpoint identified based on the operation signal is included in the specific area, the virtual viewpoint information is generated by performing correction so that the position of the virtual viewpoint indicated by the operation signal is located on the camera path.

2. The control apparatus according to claim 1, wherein in the generating, the camera path is determined in a case where the position of the virtual viewpoint identified based on the operation signal received in a time series enters the specific area from the outside of the specific area.

3. The control apparatus according to claim 2, wherein in the generating, the camera path is determined by taking the position of the virtual viewpoint in a case where the position enters the specific area from the outside of the specific area as a starting point.

4. The control apparatus according to claim 2, wherein in the generating, the camera path is determined by taking the position of the virtual viewpoint whose entering is predicted in a case where it is predicted that the position enters the specific area from the outside of the specific area as a starting point.

5. The control apparatus according to claim 1, wherein in the generating, the camera path is generated in a case where it is predicted that the position of the virtual viewpoint identified based on the operation signal received in a time series enters the specific area from the outside of the specific area.

6. The control apparatus according to claim 1, wherein in the shape data, height information defining a height of the structure by three-dimensional coordinates is included, in the camera path, height information on a virtual viewpoint in the movement path is included, and in the generating:

in determining the camera path, a height obtained by adding the height of the structure from the ground surface to the surface, which is indicated by the height information included in the shape data, and a height of the virtual viewpoint in a case where the position of the virtual viewpoint indicated by the operation signal comes to be included in the specific area is taken to be the height of the virtual viewpoint in the movement path; and the virtual viewpoint information is generated by correcting the height of the position of the virtual viewpoint indicated by the operation signal based on the height information included in the camera path.

7. The control apparatus according to claim 1, wherein in the camera path, orientation information on a virtual viewpoint in the movement path is further included and in the generating, in a case where the position of the virtual viewpoint indicated by the operation signal is included in the specific area, the virtual viewpoint information is generated by correcting the orientation of the virtual viewpoint indicated by the operation signal based on the orientation information included in the camera path.

8. The control apparatus according to claim 1, wherein the specific area is set so as to include a portion in which the height of the structure is not constant in a bird's eye view of the structure and in the generating, the camera path is determined in a case where the position of the virtual viewpoint indicated by the received operation signal comes to be included in the specific area on the bird's eye view, or in a case where it is predicted that the position of the virtual viewpoint indicated by the received operation signal is included in the specific area on the bird's eye view.

9. The control apparatus according to claim 8, wherein in the shape data, information on two-dimensional coordinates of a portion in which the height is not constant is included and in the generating, the camera path is determined based on the position in a case where the position of the virtual viewpoint indicated by the operation signal comes to be included in the specific area on the bird's eye view and the two-dimensional coordinates of the portion in which the height of the structure is not constant, which are included in the shape data.

10. The control apparatus according to claim 9, wherein the structure is a structure including a straight section whose height is constant and a curve section whose height gradually changes, in the shape data, information defining a center point of an arc of the curve section by two-dimensional coordinates on a bird's eye view of the structure is included, and in the generating, a camera path is determined, which describes an arc with the center point of the arc of the curve section as a reference, which is defined by the two-dimensional coordinates.

11. The control apparatus according to claim 10, wherein the orientation of the virtual viewpoint is represented by pan, tilt, and roll and in the generating:

a camera path is determined, which describes an arc and includes angle information on a pan axis and a tilt axis of a virtual viewpoint at each point on the movement path, by determining an angle of the pan axis of the virtual viewpoint at a second point in a case where the virtual viewpoint moves from a first point to the second point on the movement path based on an angle formed by a straight line connecting the center point and the first point and a straight line connecting the center point and the second point; and by determining an angle of the tilt axis of the virtual viewpoint at the second point in a case where the virtual viewpoint moves from the first point to the second point on the movement path based on an angle formed by a straight line connecting a point representing an inside diameter of the arc of the curve section and the first point and a straight line connecting the point representing the inside diameter of the arc of the curve section and the second point; and in a case where the position of the virtual viewpoint indicated by the operation signal is included in the specific area, the virtual viewpoint information is generated by correcting the orientation of the virtual viewpoint indicated by the operation signal based on the angle information included in the camera path describing the arc.

12. The control apparatus according to claim 9, wherein the structure is structure in which a plurality of obstacles is arranged side by side in one direction, in the shape data, information indicating a height of each of the plurality of obstacles from the ground surface is included, and in the generating, a camera path is determined, which maintains a predetermined height from the surface of each of the plurality of obstacles.

13. The control apparatus according to claim 1, wherein in the generating, the virtual viewpoint information is generated by performing correction so that the position of the virtual viewpoint indicated by the operation signal is located on the movement path indicated by the camera path.

14. The control apparatus according to claim 1, wherein the one or more processors execute the instructions to perform:

controlling to cause a display device to display a virtual viewpoint image corresponding to generated virtual viewpoint information.

15. The control apparatus according to claim 14, wherein in the controlling, the virtual viewpoint image is caused to be displayed as part of a UI screen for a user to operate a joy stick for operating a virtual viewpoint in the three-dimensional space.

16. The control apparatus according to claim 15, wherein the operation signal is an operation signal of the joy stick, degree of inclination of the joy stick and movement distance of a virtual viewpoint are associated with each other, and in the generating, correction is performed, which moves the position of the virtual viewpoint indicated by the operation signal on the movement path indicated by the camera path by an amount corresponding to the movement distance in accordance with the degree of inclination of the joy stick indicated by the operation signal.

17. The control apparatus according to claim 1, wherein the one or more processors execute the instructions to perform:

setting whether or not to perform the correction in the generating.

18. A control apparatus comprising:

one or more memories storing instructions; and one or more processors executing the instructions to perform:

obtaining shape data representing a shape of a structure existing in a three-dimensional space;

receiving an operation signal controlling a virtual viewpoint for generating a virtual viewpoint image; and generating virtual viewpoint information indicating a position and orientation of a virtual viewpoint identified based on the operation signal, wherein in the generating:

a camera path indicating a movement path of a virtual viewpoint in a specific area in the three-dimensional space is determined based on the shape data of the structure; and in a case where a position of a virtual viewpoint identified based on the operation signal is included in the specific area, the virtual viewpoint information is generated by performing control so that the position of the virtual viewpoint indicated by the operation signal does not deviate from the camera path.

19. A control method of an apparatus generating virtual viewpoint information, the control method comprising the steps of:

obtaining, by at least one processor, shape data representing a shape of a structure existing in a three-dimensional space;

receiving, by the least one processor, an operation signal controlling a virtual viewpoint for generating a virtual viewpoint image; and generating, by the least one processor, virtual viewpoint information indicating a position and orientation of a virtual viewpoint identified based on the operation signal, wherein in the generating:

a camera path indicating a movement path of a virtual viewpoint in a specific area in the three-dimensional space is determined based on the shape data of the structure; and in a case where a position of a virtual viewpoint identified based on the operation signal is included in the specific area, the virtual viewpoint information is generated by performing correction so that the position of the virtual viewpoint indicated by the operation signal is located on the movement path.

20. A non-transitory computer readable storage medium storing a program for causing a computer to perform a control method of an apparatus generating virtual viewpoint information, the control method comprising the steps of:

obtaining shape data representing a shape of a structure existing in a three-dimensional space;

receiving an operation signal controlling a virtual viewpoint for generating a virtual viewpoint image; and generating virtual viewpoint information indicating a position and orientation of a virtual viewpoint identified based on the operation signal, wherein in the generating:

a camera path indicating a movement path of a virtual viewpoint in a specific area in the three-dimensional space is determined based on the shape data of the structure; and in a case where a position of a virtual viewpoint identified based on the operation signal is included in the specific area, the virtual viewpoint information is generated by performing correction so that the position of the virtual viewpoint indicated by the operation signal is located on the movement path.

\* \* \* \* \*